(12) United States Patent
Shimosakoda

(10) Patent No.: US 10,177,893 B2
(45) Date of Patent: Jan. 8, 2019

(54) SERIAL COMMUNICATION SYSTEM

(71) Applicant: Yoshinori Shimosakoda, Tokyo (JP)

(72) Inventor: Yoshinori Shimosakoda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 266 days.

(21) Appl. No.: 14/883,845

(22) Filed: Oct. 15, 2015

(65) Prior Publication Data

US 2016/0127109 A1    May 5, 2016

(30) Foreign Application Priority Data

Oct. 29, 2014  (JP) ................................. 2014-220556

(51) Int. Cl.
   *H04L 5/14*       (2006.01)
   *H04B 17/309*   (2015.01)
   *G06F 1/12*       (2006.01)

(52) U.S. Cl.
   CPC ............. *H04L 5/14* (2013.01); *H04B 17/309* (2015.01); *G06F 1/12* (2013.01)

(58) Field of Classification Search
   CPC ......... H04B 17/309; H04B 14/04; H04L 5/14; H04L 25/4906; H04L 25/38; H04L 25/069
   USPC ....................................................... 370/276
   See application file for complete search history.

(56) References Cited

U.S. PATENT DOCUMENTS

| 3,549,804 A | * | 12/1970 | Whitaker | ................ | H04L 7/033 327/261 |
| 3,980,820 A | * | 9/1976 | Niemi | ................... | H04L 7/0331 375/373 |
| 4,380,080 A | * | 4/1983 | Rattlingourd | ...... | G11B 20/1492 327/28 |
| 4,737,722 A | * | 4/1988 | Ramesh | ................ | H04L 7/0331 327/141 |

(Continued)

FOREIGN PATENT DOCUMENTS

| JP | 8-098284 | 4/1996 |
| JP | 11-098200 | 4/1999 |
| JP | 2008-099228 | 4/2008 |

OTHER PUBLICATIONS

Iyengar et al. "Deterministic Built-in Pattern Generation for Sequential Circuits", Apr. 1998, IEEE, IEEE VLSI Test Symposium, pp. 418-423.*

*Primary Examiner* — Un C Cho
*Assistant Examiner* — Shah M Rahman
(74) *Attorney, Agent, or Firm* — Oblon, McClelland, Maier & Neustadt, L.L.P.

(57) ABSTRACT

The serial communication system includes a first communication device and a second communication device connected with the first communication device. The first communication device and the second communication device respectively operates in response to a first clock signal and a second clock. The first communication device generates a first training signal, transmits the first training signal to the second communication device, encodes a first data signal to (Continued)

generate a first encoded signal, and transmits the first encoded signal to the second communication device. The second communication device measures a second interval length, receives the first encoded signal from the first communication device, and decodes the first data signal from the first encoded signal by detecting the level of the first encoded signal at a preset first point of time preset and a preset second point of time.

12 Claims, 19 Drawing Sheets

(56) References Cited

U.S. PATENT DOCUMENTS

| | | | |
|---|---|---|---|
| 4,805,197 A * | 2/1989 | Van Der Jagt | H04L 7/0066 375/333 |
| 5,047,921 A * | 9/1991 | Kinter | G06F 13/1663 700/5 |
| 5,181,201 A * | 1/1993 | Schauss | G06F 13/124 370/359 |
| 5,428,769 A * | 6/1995 | Glaser | G05B 9/03 700/4 |
| 5,532,692 A * | 7/1996 | Tatsuya | G06K 7/0008 340/10.1 |
| 5,657,347 A * | 8/1997 | Mori | H04L 7/044 375/225 |
| 6,275,526 B1 * | 8/2001 | Kim | H04L 1/1803 370/276 |
| 6,831,523 B1 * | 12/2004 | Pastorello | H03L 7/085 331/1 A |
| 2002/0154294 A1 * | 10/2002 | Hedges | F41G 7/303 356/139.04 |
| 2003/0081782 A1 * | 5/2003 | Coles | H03M 5/145 380/260 |
| 2005/0135527 A1 * | 6/2005 | Masui | H04L 7/0338 375/355 |
| 2005/0156649 A1 * | 7/2005 | Tang | G06F 1/04 327/291 |
| 2006/0104396 A1 * | 5/2006 | Soriano | G06F 13/4282 375/362 |
| 2007/0127458 A1 * | 6/2007 | Small | H04L 1/0047 370/389 |
| 2012/0075009 A1 * | 3/2012 | Barrenscheen | H02M 3/3376 327/536 |
| 2013/0246831 A1 * | 9/2013 | Yuzawa | G06F 1/12 713/400 |

* cited by examiner

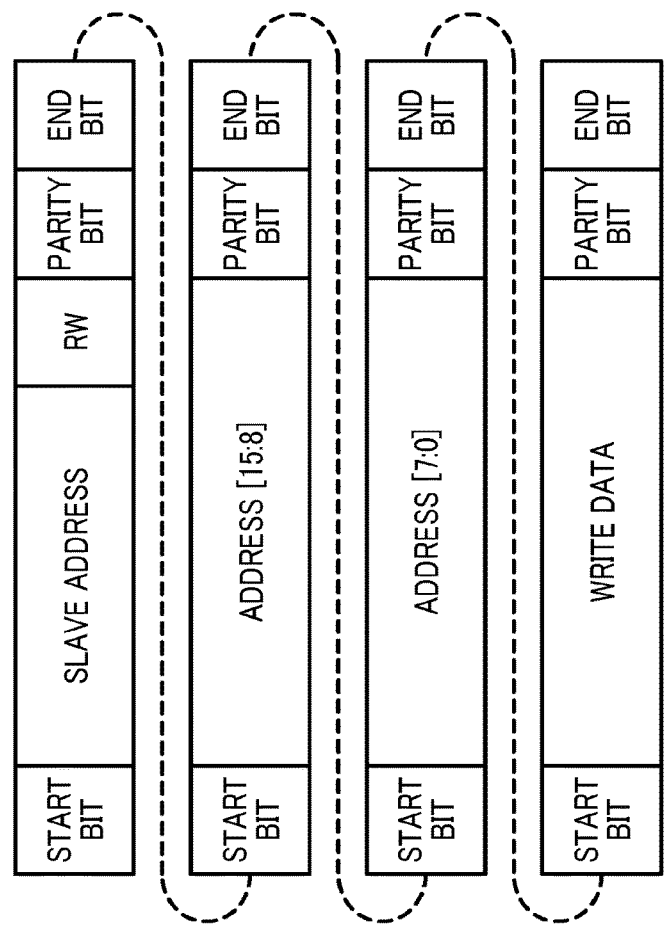

FIG. 25

| START BIT | D0 | D1 | D2 | D3 | D4 | D5 | D6 | D7 | ECC0 | ECC1 | ECC2 | ECC3 | END BIT |

SERIAL COMMUNICATION SYSTEM

CROSS-REFERENCE TO RELATED APPLICATIONS

This patent application is based on and claims priority pursuant to 35 U.S.C. § 119 to Japanese Patent Application No. 2014-220556 on Oct. 29, 2014 in the Japan Patent Office, the entire disclosure of which is hereby incorporated by reference herein.

BACKGROUND

Technical Field

The present invention relates to a serial communication system.

Background Art

Many serial interface specifications have been practically used use to transmit a massive amount of data at a high speed.

For example, bidirectional communications are made between such as a camera and a controller and a display and a controller via a serial transmission line in a mobile phone. In this kind of bidirectional communications, for example, a massive amount of data such as image data are transmitted in the forward direction, and a relatively small quantity of data such as a control signal for controlling a circuit to transmit data in the forward direction are transmitted in the backward direction.

As the bidirectional communications, a full-duplex system to conduct concurrent communications in real time and a half-duplex system to conduct communications mutually in time-sharing. In the full-duplex system, multiple channels are utilized and signal lines only for the backward direction are provided. For this reason, more number of signal lines are required when compared with the half-duplex system. The half-duplex system is advantageous in terms of cost unless quick bidirectional communications are necessary.

As low speed full-duplex system communications, universal asynchronous receiver transmitter (UART) is already known.

For example, universal asynchronous serial data transmitters and receivers are introduced. The transmitter modulates single bit data to two bit data having different logical values and the receiver conducts reception synchronous to bit data by detecting the changing point of the logical values. This makes it possible to avoid errors ascribable to the difference between the clock frequency number of the transmitter and the clock frequency number of the receiver.

However, in conventional low speed asynchronous communication method, sufficiently precise clock signals are required in both a transmitter and a receiver.

SUMMARY

The present invention provides an improved serial communication system which includes a first communication device and a second communication device connected to the first communication device through a serial transmission line. The first communication device operates in response to a first clock signal having a first clock frequency and the second communication device operates in response to a second clock signal having a second clock frequency. The first communication device generates a first training signal including a high level interval and a low level interval in a single cycle, each having a first interval length having a clock number set in advance, transmits the first training signal to the second communication device, encodes a first data signal to generate a first encoded signal including the high level interval and the low level interval in the single cycle, each having the first interval length, and transmits the first encoded signal to the second communication device. The first encoded signal represents a single bit of the first data signal by transition between the high level interval and the low level interval in the single cycle. The second communication device receives the first training signal from the first communication device, measures a second interval length representing the clock number of the high level interval and the low level interval in the single cycle of the first training signal based on the second clock signal, receives the first encoded signal from the first communication device, and decodes the first data signal from the first encoded signal by detecting the level of the first encoded signal at a first point of time preset in a period from the a rise or a fall of the first encoded signal to less than the second interval length from the rise or the fall and a second point of time preset in a period from later than the second interval length from the rise or the fall of the first encoded signal to less than a twofold of the second interval length from the rise or the fall.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 7 is a diagram illustrating the format of data signals transmitted in the serial communication system illustrated in FIG. 1;

FIG. 8 is a diagram illustrating the format when the data signal transmitted in the serial communication system illustrated in FIG. 1 is a write command and write data from an interface circuit 2 to an interface circuit 4;

FIG. 25 is a diagram illustrating the waveform of data signals transmitted in the serial communication system illustrated in FIG. 24.

DETAILED DESCRIPTION

Figure 1:
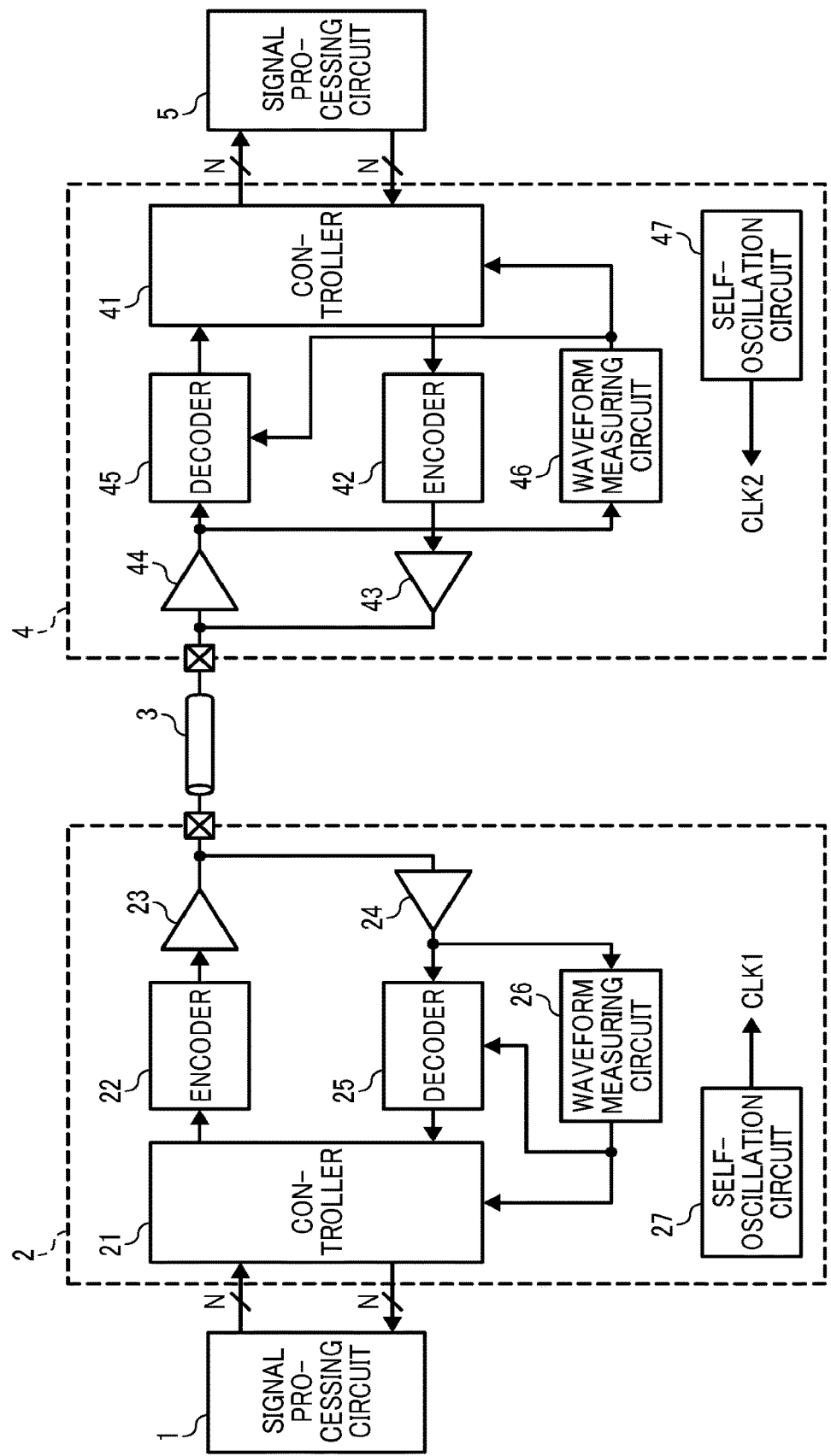
FIG. 1 is a block diagram illustrating the configuration of a serial communication system according to a first embodiment of the present disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Preferred embodiments of the present invention are described in detail below with reference to the accompanying drawings. Although the presently preferred embodiments of the present invention are described with various technically preferred limitations, the scope of the invention should not be construed as limited by the embodiments discussed below. It should not be construed that all of elements of the embodiments discussed below are essential to the invention unless specifically stated as such.

First Embodiment

FIG. 1 is a block diagram illustrating the configuration of a serial communication system according to a first embodiment of the present disclosure. The serial communication system illustrated in FIG. 1 includes a signal processing circuit 1, an interface circuit 2, a serial transmission line 3, an interface circuit 4, and a signal processing circuit 5. The interface circuits 2 and 4 are connected with each other via the serial transmission line 3. The signal processing circuits 1 and 5 transmit and receive data signals (for example, UART signals) via the interface circuits 2 and 4 and the serial transmission line 3.

The interface circuit 2 has a controller 21, an encoder 22, a driver 23, a receiver 24, a decoder 25, a waveform measuring circuit 26, and a self-oscillation circuit 27. The encoder 22 and the driver 23 operate as a transmission circuit and the receiver 24 and the decoder 25 operate as a reception circuit. The self-oscillation circuit 27 generates a first clock signal CLK1 having a first clock frequency number f1 and transmits the clock signal to the controller 21, the encoder 22, the decoder 25, and the waveform measuring circuit 26.

The interface circuit 4 has a controller 41, an encoder 42, a driver 43, a receiver 44, a decoder 45, a waveform measuring circuit 46, and a self-oscillation circuit 47. The encoder 42 and the driver 43 operate as a transmission circuit and the receiver 44 and the decoder 45 operate as a reception circuit. The self-oscillation circuit 47 generates a second clock signal CLK2 having a second clock frequency number f2 and transmits the clock signal to the controller 41, the encoder 42, the decoder 45, and the waveform measuring circuit 46.

The clock frequencies f1 and the f2 may be the same or different. Since the interface circuits 2 and 4 are connected with each other via the serial transmission line 3, the interface circuit on the reception side asynchronously receives the data signal.

For example, the interface circuit 2 is a first communication device that operates as a master and the interface circuit 4 is a second communication device that operates as a slave. In this case, for example, the serial transmission line 3 receives a command from the signal processing circuit 1 and transmits the command to the interface circuit 4 via the serial transmission line 3. Next, the interface circuit 4 transmits the command received from the signal processing circuit 1 to the signal processing circuit 5, receives a command response or other data from the signal processing circuit 5, and transmits it to the interface circuit 2 via the serial transmission line 3.

When transmitting the first data signal from the signal processing circuit 1 to the signal processing circuit 5, the serial communication system illustrated in FIG. 1 operates in the following manner.

In the interface circuit 2, the controller 21 generates a first training signal having a high level interval (H interval) and a low level interval (L interval) in a single cycle, each having a first interval length of a preset clock number based on the clock signal CLK 1.

The encoder 22 and the driver 23 transmit the first training signal to the interface circuit 4. In the interface circuit 4, the receiver 44 receives the first training signal from the interface circuit 2. The waveform measuring circuit 46 measures a second interval length indicating the clock number of the H interval and the L interval contained in a single cycle of the first training signal based on the clock signal CLK2. The waveform measuring circuit 46 notifies the controller 41 and the decoder 45 of the second interval length. In the interface circuit 2, the encoder 22 encodes the first data signal and generates a first encoded signal having an H interval and an L interval in a single cycle, each having the first interval length. The first encoded signal represents a single bit of the first data signal by transition between the H interval and the L interval in a single cycle. The driver 23 transmits the first encoded signal to the interface circuit 4. In the interface circuit 4, the receiver 44 receives the first training signal from the interface circuit 2 and the decoder 45 decodes the first data signal from the first encoded signal in the following manner. The decoder 45 detects the level of the first encoded signal at the first point of time preset in a period from the rise or fall of the first encoded signal to less than the second interval length from the rise or the fall. The decoder 45 furthermore detects the level of the first encoded signal at the second point of time preset in a period from later than the second interval length from the rise or the fall of the first encoded signal to less than a twofold of the second interval length from the rise or the fall.

When transmitting the second data signal from the signal processing circuit 5 to the signal processing circuit 1, the serial communication system illustrated in FIG. 1 operates in the following manner.

In the interface circuit 4, the controller 41 generates a second training signal having an H interval and an L interval in a single cycle, each having a third interval length of a preset clock number based on the clock signal CLK 2. The encoder 42 and the driver 43 transmit the second training signal to the interface circuit 2. In the interface circuit 2, the receiver 24 receives the second training signal from the interface circuit 4.

The waveform measuring circuit 26 measures a fourth interval length indicating the clock number of the H interval and the L interval contained in a single cycle of the second training signal based on the clock signal CLK1. The waveform measuring circuit 26 notifies the controller 21 and the decoder 25 of the fourth interval length. In the interface circuit 4, the encoder 42 encodes the second data signal and generates a second encoded signal having an H interval and an L interval in a single cycle, each having the third interval length. The second encoded signal represents a single bit of the second data signal by transition between the H interval and the L interval in a single cycle. The driver 43 transmits the second encoded signal to the interface circuit 2. In the interface circuit 2, the receiver 24 receives the second training signal from the interface circuit 4 and the decoder 25 decodes the second data signal from the second encoded signal in the following manner. The decoder 25 detects the level of the second encoded signal at the third point of time preset in a period from the rise or fall of the second encoded signal to less than the fourth interval length therefrom. The decoder 25 furthermore detects the level of the second encoded signal at the fourth point of time preset in a period from later than a single fold of the fourth interval length from the rise or fall of the second encoded signal to less than two fold of the fourth interval length. A symbol "N" represents the number of bits of parallel data.

Figure 2:
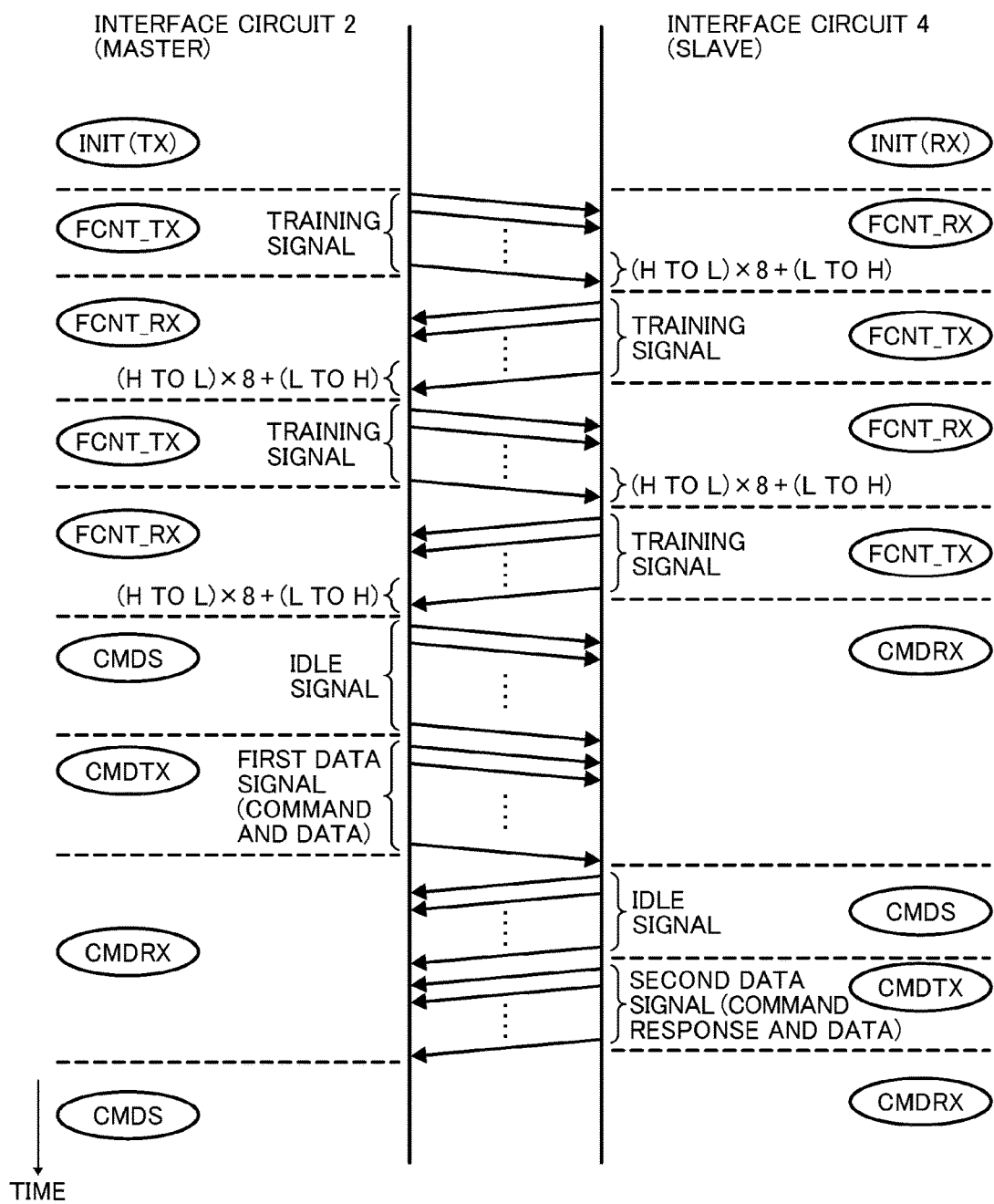
FIG. 2 is a sequence diagram illustrating behaviors of serial communication system illustrated in FIG. 1.

FIG. 2 is a sequence diagram illustrating behaviors of the serial communication system illustrated in FIG. 1.

According to the example illustrated in FIG. 2, the interface circuit 2 (master) operates in the following manner.

The interface circuit 2 is in the reset state INIT (TX) after initialization. The controller 21 transits to the first-time training signal transmission state (FCNT_TX) after the reset is canceled.

In the first-time FCNT_TX, the controller 21 generates a first training signal having an H interval and an L interval in a single cycle, each having a first interval length of a preset clock number based on the clock signal CLK1. The first training signal alternately includes the H interval and the L interval. Each cycle of the first training signal contains, for example, a transition (H to L) from the high level to the low level. The controller 21 generates the first training signal over a preset cycle and the encoder 22 and the driver 23 transmit the first training signal to the interface circuit 4. The first interval length is, for example, 15 clocks and the cycle continuing generating the first training signal is, for example, 32 times. When the controller 21 generates the first training signal over a preset cycle, the controller 21 transmits a stop command to the interface circuit 4 and transits to a first-time training signal reception state FCNT_RX. The stop command includes a transition in the reverse direction (for example, low level to high level, L to H) to the transition of the level in each cycle of the first training signal.

In the first-time FCNT_RX, the receiver 24 receives the second training signal transmitted from the interface circuit 4. The second training signal is the same as the first training signal except that the second training signal is generated based on the clock signal CLK2 instead of the clock signal CLK1. The waveform measuring circuit 26 measures a fourth interval length indicating the clock number of the H interval and the L interval contained in a single cycle of the second training signal based on the clock signal CLK1. When the second training signal is received over a preset cycle and a first stop command is received from the interface circuit 4, the controller 21 transits to a second-time training signal reception state FCNT_TX. The cycle that continues receiving the second training signal before receiving the stop command is, for example, 8 times.

In the second-time state FCNT_TX, the controller 21 generates a first training signal again. The first training signal generated in the second-time FCNT_TX is the same as the first training signal generated in the first-time state FCNT_TX. The controller 21 generates the first training signal over a preset cycle and the encoder 22 and the driver 23 transmit the first training signal to the interface circuit 4. When the controller 21 generates the first training signal over a preset cycle, the controller 21 transmits a stop command to the interface circuit 4 and transits to a second-time training signal reception state FCNT_RX.

In the second-time FCNT_RX, the receiver 24 receives the second training signal transmitted from the interface circuit 4. The second training signal received in the second-time FCNT_RX is the same as the second training signal received in the first-time state FCNT_RX. The waveform measuring circuit 26 measures a fourth interval length indicating the clock number of the H interval and the L interval contained in a single cycle of the second training signal based on the clock signal CLK1. When the second training signal is received over a preset cycle and a second stop command is received from the interface circuit 4, the controller 21 transits to a data signal reception stand-by state CMDS.

In the state CMDS, the controller 21 stands by until the first data signal (command or data) is input from the signal processing circuit 1 while transmitting idle signals to the interface circuit 4. The idle signal alternately contains the H interval and the L interval as in the case of the first training signal. Each cycle of the idle signal contains, for example, a transition (H to L) from the high level to the low level. When the first data signal is input from the signal processing circuit 1, the controller 21 transits to a data signal transmission state CMDTX.

In the state CMDTX, the encoder 22 encodes the first data signal and generates a first encoded signal having an H interval and an L interval in a single cycle, each having the first interval length. The first encoded signal represents a single bit of the first data signal by transition between the H interval and the L interval in a single cycle (refer to FIG. 12). This makes the maximum of the continuous high level or low level two-fold of the first interval length, so that a changing point surely appears in the single cycle of the first encoded signal. In addition, the first encoded signal has, for example, the format illustrated in FIG. 7. The first encoded signal includes a preset start bit in front. The start bit includes a transition (for example, low level to high level, L to H) in the reverse direction to the transition of the level in each cycle of an idle signal. When the interface circuit 4 receives the first encoded signal from the interface circuit 2 after the idle signal, the decoder 45 identifies the first encoded signal by detecting the start bit of the first encoded signal. The driver 23 transmits the first encoded signal to the interface circuit 4. When the transmission of the first encoded signal is complete, the controller 21 transits to the data signal reception state CMDRX.

In the state CMDRX, the controller 21 stands by for the reception of the second encoded signal from the interface circuit 4. The decoder 25 identifies the second encoded signal by detecting the start bit of the second encoded signal received from the interface circuit 4 after the idle signal. When the receiver 24 receives the second encoded signal from the interface circuit 4, the decoder 25 decodes the second data signal from the second encoded signal in the following manner. The decoder 25 detects the level of the second encoded signal at the third point of time preset in a period from the rise or fall of the second encoded signal to less than the fourth interval length therefrom.

The decoder 25 furthermore detects the level of the second encoded signal at the fourth point of time preset somewhere between the rise or fall of the second encoded signal and a point slower than a single fold of the fourth interval length and less than two fold of the fourth interval length. When the second encoded signal is received, the controller 21 transits to the data signal stand-by state CMDS.

After the controller 21 is back to the state CMDS, the controller 21 stands by until the first data signal is input again from the signal processing circuit 1 while transmitting idle signals to the interface circuit 4.

Thereafter, the controller 21 repeats transitions between the state CMDS, CMDTX, and CMDRX.

According to the example illustrated in FIG. 2, the interface circuit 4 (slave) operates in the following manner.

The interface circuit 4 is in the reset state INIT (TX) after initialization. The controller 41 transits to the first-time training signal transmission state FCNT_RX after the reset is canceled.

In the first-time FCNT_RX, the receiver 44 receives the first training signal transmitted from the interface circuit 2. The waveform measuring circuit 46 measures a second interval length indicating the clock number of the H interval and the L interval contained in a single cycle of the first training signal based on the clock signal CLK2. When the second training signal is received over a preset cycle and the first training signal is received from the interface circuit 2, the controller 41 transits to a first-time training signal reception state FCNT_TX.

In the first-time FCNT_TX, the controller 41 generates a second training signal having an H interval and an L interval in a single cycle, each having a third interval length of a preset clock number based on the clock signal CLK2. The second training signal alternately includes the H interval and the L interval. Each cycle of the second training signal includes, for example, a transition (H to L) from the high level to the low level. The controller 41 generates the second training signal over a preset cycle and the encoder 42 and the driver 43 transmit the second training signal to the interface circuit 2. The third interval length is, for example, 15 clocks and the cycle continuing generating the second training signal is, for example, 32 times. When the controller 41 generates the second training signal over a preset cycle, the controller 41 transmits a stop command to the interface circuit 2 and transits to the second-time training signal reception state FCNT_RX. The stop command includes a transition in the reverse direction (for example, low level to high level, L to H) in each cycle of the second training signal.

In the second-time FCNT_RX, the receiver 44 receives the first training signal transmitted from the interface circuit 2. The waveform measuring circuit 46 measures a second interval length indicating the clock number of the H interval and the L interval contained in a single cycle of the first training signal based on the clock signal CLK2. When the second training signal is received over a preset cycle and the second stop command is received from the interface circuit 2, the controller 41 transits to a second-time training signal reception state FCNT_TX.

In the second-time FCNT_TX, the controller 41 generates the second training signal again. The second training signal generated in the second-time FCNT_TX is the same as the second training signal generated in the first-time state FCNT_TX. The controller 41 generates the second training signal over a preset cycle and the encoder 42 and the driver 43 transmit the second training signal to the interface circuit 2. When the controller 41 generates the second training signal over a preset cycle, the controller 41 transmits a stop command to the interface circuit 2 and transits to the data signal reception state CMDRX.

In the state CMDRX, the controller 41 stands by for the reception of the first encoded signal from the interface circuit 2. The decoder 45 identifies the first encoded signal by detecting the start bit of the first encoded signal received from the interface circuit 2 after the idle signal. When the receiver 44 receives the first encoded signal from the interface circuit 2, the decoder 45 decodes the first data signal from the first encoded signal in the following manner. The decoder 45 detects the level of the first encoded signal at the first point of time preset in a period from the rise or fall of the first encoded signal to less than the second interval length from the rise or the fall.

The decoder 45 furthermore detects the level of the first encoded signal at the second point of time preset in a period from later than the second interval length from the rise or the fall of the first encoded signal to less than a twofold of the second interval length from the rise or the fall. When the first encoded signal is received, the controller 41 transits to a data signal stand-by state CMDS. In addition, the controller 41 transmits the first data signal to the signal processing circuit 5 for further processing.

In the state CMDS, the controller 41 stands by until the second data signal (command or data) is input from the signal processing circuit 5 while transmitting idle signals to the interface circuit 4. The idle signal alternately includes the H interval and the L interval as in the case of the second training signal. Each cycle of the idle signals includes, for example, a transition (H to L) from the high level to the low level. When the second data signal is input from the signal processing circuit 5, the controller 41 transits to the data signal transmission state CMDTX.

In the state CMDTX, the encoder 42 encodes the second data signal and generates a second encoded signal having an H interval and an L interval in a single cycle, each having the third interval length. The second encoded signal represents a single bit of the second data signal by transition between the H interval and the L interval in a single cycle. This makes the maximum of the continuous high level or low level two-fold of the first interval length, so that a changing point surely appears in the single cycle of the second encoded signal. In addition, for example, the second encoded signal has the format illustrated in FIG. 7. The second encoded signal includes a preset start bit in front. The start bit includes a transition in the reverse direction (for example, low level to high level, L to H) in each cycle of the idle signals. When the interface circuit 2 receives the second encoded signal from the interface circuit 4 after the idle signal, the decoder 25 identifies the second encoded signal by detecting the start bit of the second encoded signal. The driver 43 transmits the second encoded signal to the interface circuit 2. When the transmission of the second encoded signal is complete, the controller 41 transits to the data signal reception state CMDRX.

After the controller 41 is back to the state CMDRX, the controller 41 stands by until the second data signal is input again from the signal processing circuit 5 while transmitting idle signals to the interface circuit 2.

Thereafter, the controller 41 repeats transitions between the state CMDRX, CMDS, and CMDTX.

For example, when the first data signal is the write command or the read command from the interface circuit 2 to the interface circuit 4, the interface circuit 2 and the interface circuit 4 operate in the following manner. The interface circuit 2 transmits the first data signal (FIG. 8) including the write command (address of the interface circuit 4, address in which data are written) and write data to the interface circuit 4 in the data signal transmission state CMDTX. The interface circuit 4 transmits the second data signal (FIG. 9) including the write command and ACK (command response) to the write data to the interface circuit 2.

For example, when the first data signal is the read command from the interface circuit 2 to the interface circuit 4, the interface circuit 2 and the interface circuit 4 operate in the following manner.

The interface circuit 2 transmits the first data signal (FIG. 10) including the read command (address of the interface circuit 4, address from which data are read) to the interface circuit 4 in the data signal transmission state CMDTX. The interface circuit 4 transmits the second data signal (FIG. 11) including the read data to the interface circuit 2.

Figure 3:
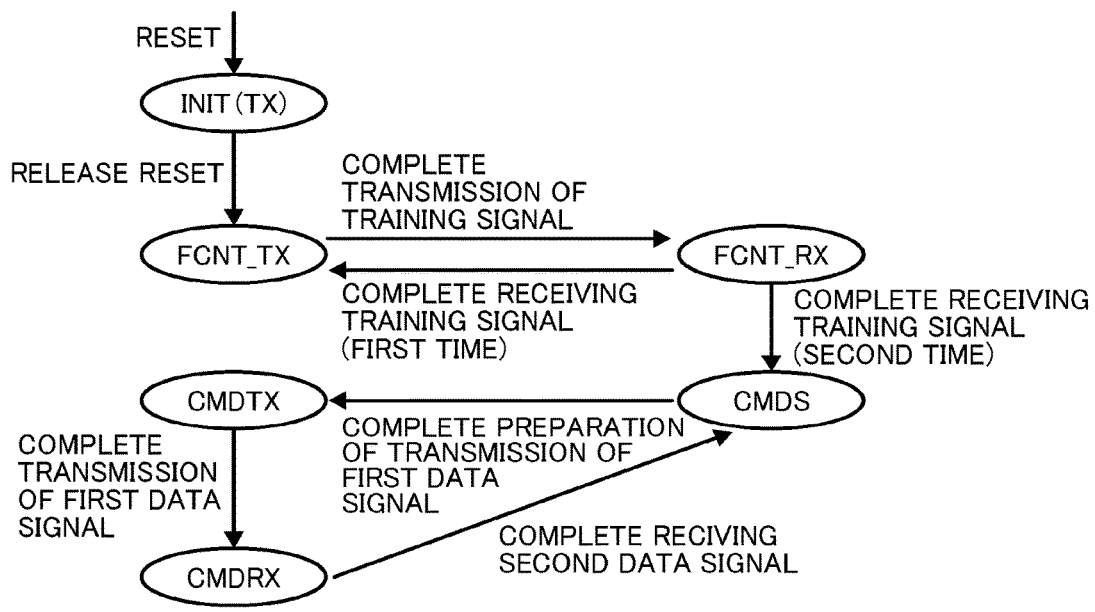
FIG. 3 is a state transition diagram illustrating behaviors of the interface circuit 2 illustrated in FIG. 1.
Figure 4:
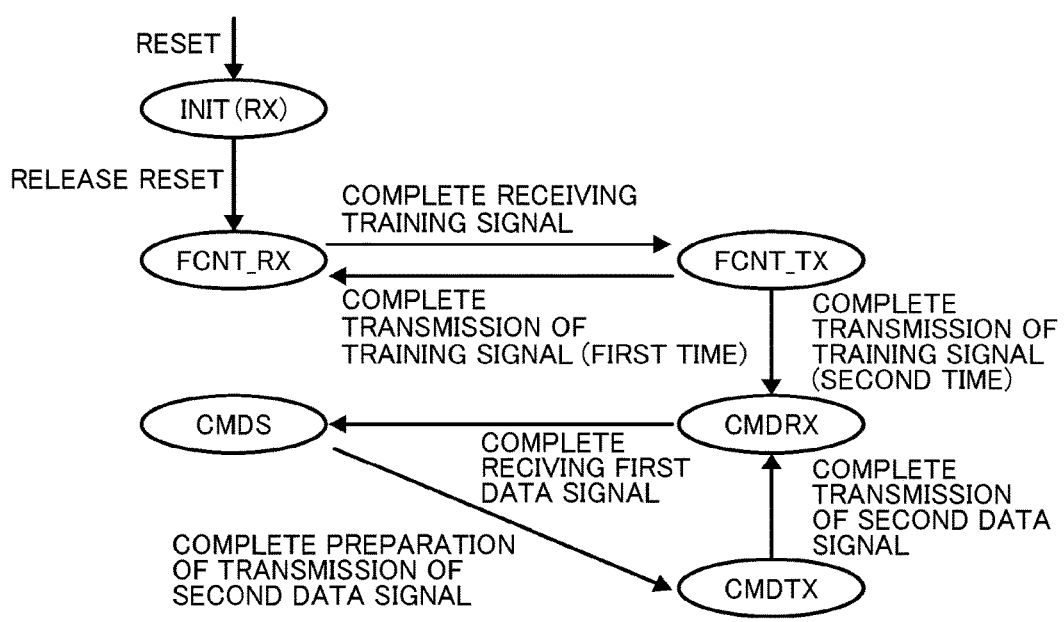
FIG. 4 is a state transition diagram illustrating behaviors of the interface circuit 4 illustrated in FIG. 1.

FIG. 3 is a state transition diagram illustrating behaviors of the interface circuit 2 illustrated in FIG. 1. FIG. 4 is a state transition diagram illustrating behaviors of the interface circuit 4 illustrated in FIG. 1. The transition diagrams of FIG. 3 and FIG. 4 correspond to the sequence diagram illustrated in FIG. 2. Both the interface circuit 2 (master) and the interface circuit 2 (slave) are in the reset state (INIT (TX), (INIT (RX)) after initialization. Since one of the interface circuit 2 and the interface circuit 4 may be delayed depending on the timing of reset cancellation thereof, first the interface circuit 2 and the interface circuit 4 repeat each of the training signal transmission state FCNT_TX and the training signal reception state FCNT_RX twice. Thereafter, the interface circuit 2 transits to the data communication stand-by state CMDS and the interface circuit 4 transmits to the data signal reception state CMDRX. The interface circuit 2 stands by at the state CMDS until the first data signal is input from the signal processing circuit 1. The interface circuit 4 stands by at the state CMDTX until the interface circuit 4 receives the first encoded signal from the interface circuit 2 via the serial transmission line 3. When the first data signal is input into the interface circuit 2, the interface circuit 2 repeats the sequence of "CMDS, CMDTX, and CMDRX" and the interface circuit 4 repeats the sequence of "CMDRX, CMDS, and CMDTX". In a state in which the first data signal is not input into the interface circuit 2, the interface circuit 2 stands by at the state CMDS and the interface circuit 4 stands by at the state CMDRX.

Figure 5:
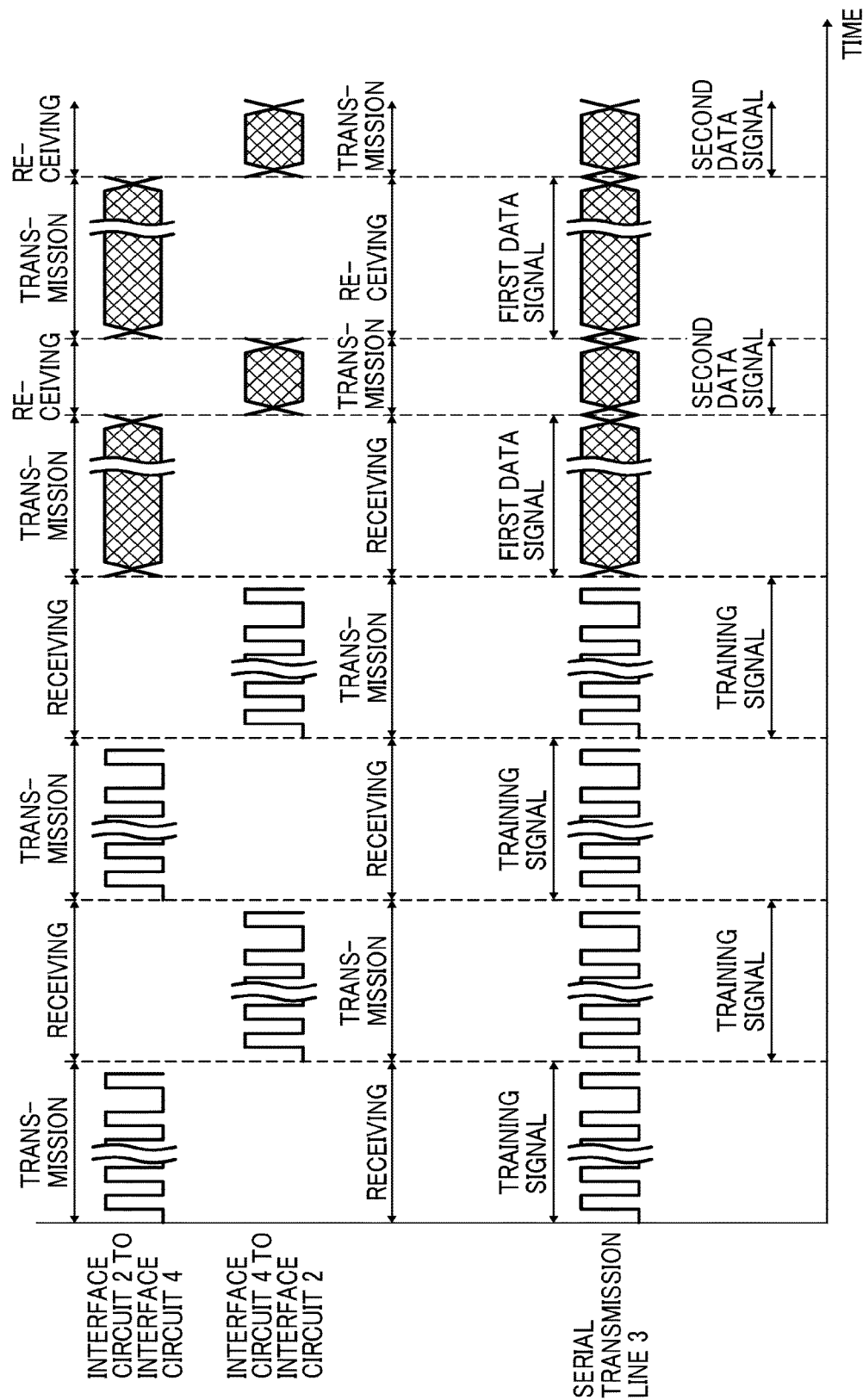
FIG. 5 is a timing diagram illustrating the direction of signal transmission in the serial communication system illustrated in FIG. 1.

FIG. 5 is a timing diagram illustrating the direction of the signal transmission in the serial communication system illustrated in FIG. 1. FIG. 5 is a diagram illustrating switching of transmission and reception of the training signal and data signal in regard to the sequence diagram illustrated in FIG. 2. In the upper part and the middle part of FIG. 5, the signal transmission from the interface circuit 2 to the interface circuit 4 and the signal transmission from the interface 4 to the interface circuit 2 are separated for illustration. In real, as illustrated in the lower part of FIG. 5, bidirectional communications are conducted using time-division on the serial transmission line 3.

Figure 6:
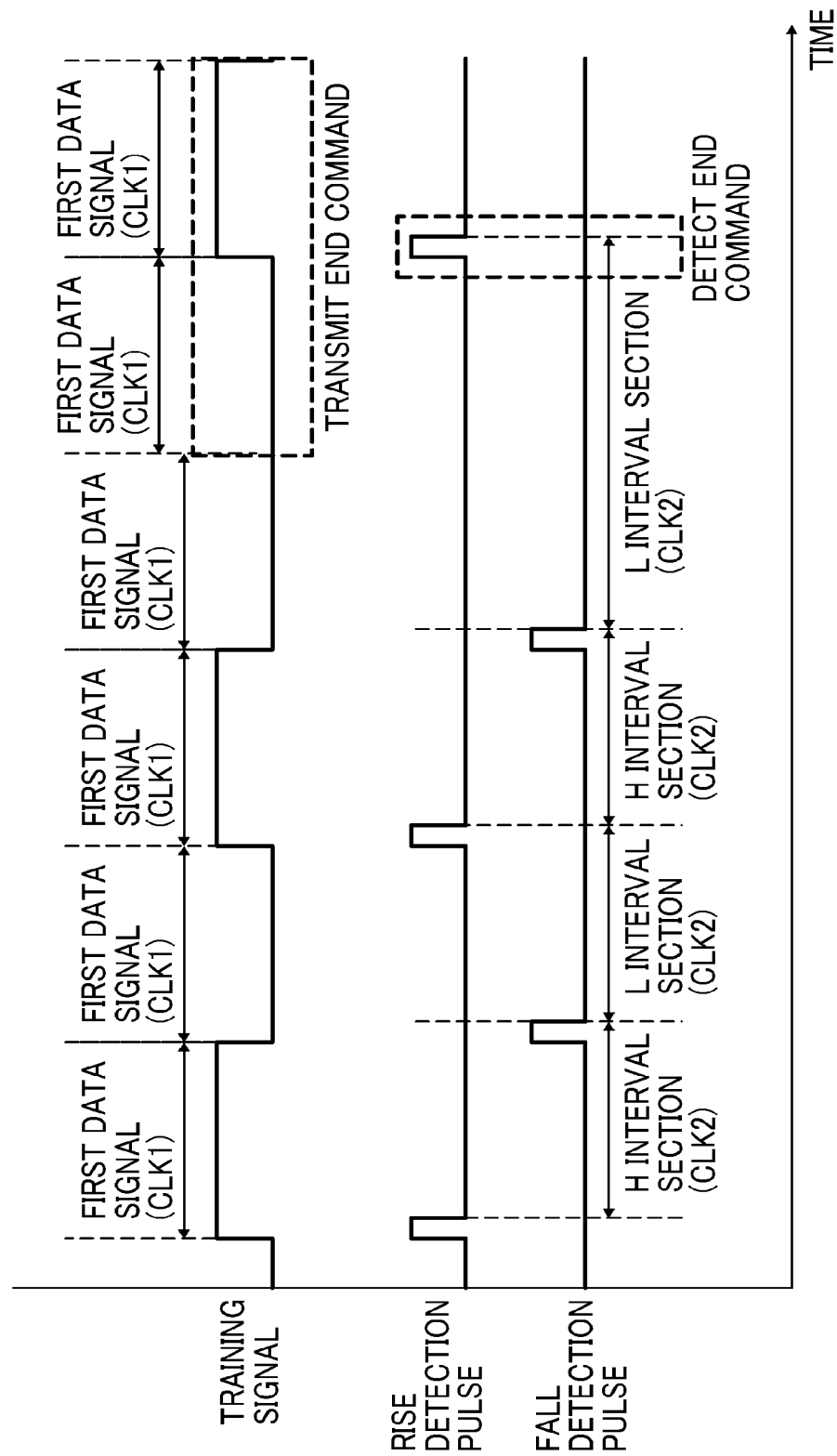
FIG. 6 is a timing diagram illustrating waveform measuring in the serial communication system illustrated in FIG. 1.

FIG. 6 is a timing diagram illustrating waveform measuring in the serial communication system illustrated in FIG. 1. The behavior of the waveform measuring circuit 46 of the interface circuit 4 is described referring to FIG. 6. The interface circuit 2 generates the first training signal having an H interval and an L interval in a single cycle, each having the first interval length of a preset clock number (for example, 15 clocks) based on the clock signal CLK1. In other words, the first interval length is the length of the H interval and the length the L interval represented by the clock number of the clock signal CLK1. When the waveform measuring circuit 46 of the interface circuit 4 detects a rise of the first training signal, it generates a rise detection pulse. When detecting a fall of the first training signal, the circuit 46 generates a fall detection pulse. The waveform measuring circuit 46 regards the interval from the rise detection pulse to the fall detection pulse as the H interval of the first training signal, and the interval from the fall detection pulse to the rise detection pulse as the L interval of the first training signal. The waveform measuring circuit 46 measures an H interval length and an L interval length representing the clock number of the H interval and the L interval contained in a single cycle of the first training signal based on the clock signal CLK2.

In other words, the H interval length and the L interval length respectively are the length of the H interval and the L interval represented by the clock number of the clock signal CLK2. When the first training signal is generated over preset cycles (for example, 32 cycles), the interface circuit 2 transmits a stop command to the interface circuit 4. The waveform measuring circuit 46 calculates the average Have of the four H interval lengths immediately before the stop command and the average Lave of the fifth to the second L interval length immediately before the stop command. As described above, when each cycle of the first training signal includes "H to L" transition, the stop command includes "L to H" transition, and the stop command is received, the L interval length is twice as long as the average Lave of the L interval length. Accordingly, when the L interval length is as twice as long as the Lave of the L interval length, the waveform measuring circuit 46 determines that it has detected a stop command. The waveform measuring circuit 46 acquires the average Have of the H interval length and the average Lave of the L interval length as the second interval length.

The waveform measuring circuit 26 of the interface circuit 2 also operates in the same manner as the waveform measuring circuit 46 of the interface circuit 4.

FIG. 7 is a diagram illustrating the format of data signals transmitted in the serial communication system illustrated in FIG. 1. FIG. 7 represents the format of the first and the second data signal (original signal) before encoding and, for example, it is serialized as a frame of 9 bit transmission mode including a single byte data bit and a parity bit according to the UART communications protocol. The frame of the data signal illustrated in FIG. 7 initially includes the start bit, thereafter includes an eight bit data bit in the sequence of from LSB to MSB, and then includes a parity bit and a end bit. The parity bit is 1 when the number of "1" in the data bits D0 to D7 is an odd number and 0 in the case of an end number. This can be reversed and preset between the interface circuit 2 and the interface circuit 4.

FIG. 8 is a diagram illustrating the format when the data signal transmitted in the serial communication system illustrated in FIG. 1 is the write command and the write data from the interface circuit 2 to the interface circuit 4. The write command and the write data have, for example, a 4 byte frame configuration. The first frame includes a slave address (address of the interface circuit 4) and a bit RW designating read or write. The second and the third frames include two-byte addresses to write in data (for example, an internal address of the signal processing circuit 5 serving as a storage device). The fourth frame includes a single byte write data.

Figure 9:
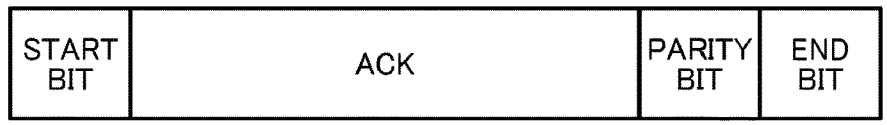
FIG. 9 is a diagram illustrating the format when the data signal transmitted in the serial communication system illustrated in FIG. 1 is an ACK from the interface circuit 4 to the interface circuit 2.

FIG. 9 is a diagram illustrating the format when the data signal transmitted in the serial communication system illustrated in FIG. 1 is the ACK from the interface circuit 4 to the interface circuit 2. The data signal illustrated in FIG. 9 is, for example, a command response to the write command and the write data illustrated in FIG. 8. The frame illustrated in FIG. 9 includes, for example, a single byte ACK.

Figure 10:
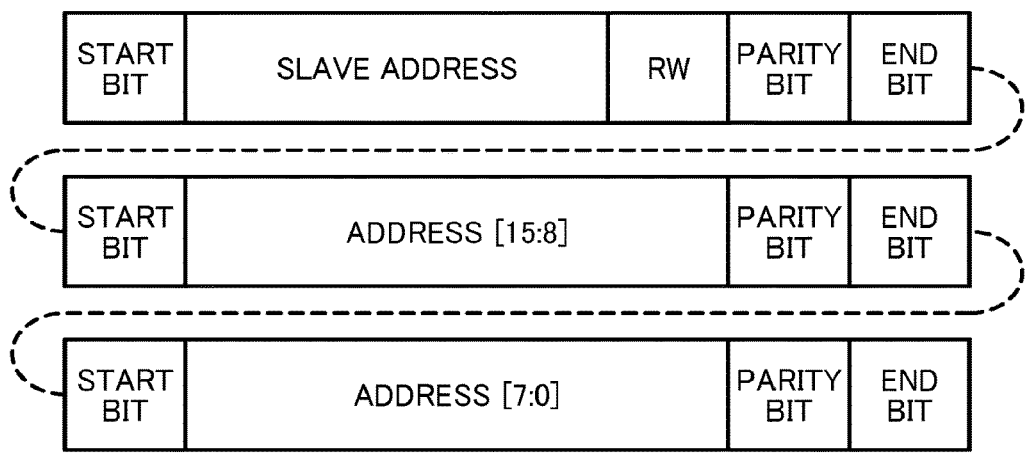
FIG. 10 is a diagram illustrating the format when the data signal transmitted in the serial communication system illustrated in FIG. 1 is a read command from the interface circuit 2 to the interface circuit 4.

FIG. 10 is a diagram illustrating the format when the data signal transmitted in the serial communication system illustrated in FIG. 1 is the read command from the interface circuit 2 to the interface circuit 4. The read command has, for example, a 4 byte frame configuration. The first frame includes a slave address (address of the interface circuit 4) and a bit RW designating read or write. The second and the third frames include two-byte addresses to read data from (for example, an internal address of the signal processing circuit 5 serving as a storage device).

Figure 11:
FIG. 11 is a diagram illustrating the format when the data signal transmitted in the serial communication system illustrated in FIG. 1 is read data from the interface circuit 4 to the interface circuit 2.

FIG. 11 is a diagram illustrating the format when the data signal transmitted in the serial communication system illustrated in FIG. 1 is the read data from the interface circuit 4 to the interface circuit 2. The data signal illustrated in FIG. 11 is a command response to the read command illustrated in FIG. 10. The frame illustrated in FIG. 11 includes a single-byte read data.

Figure 12:
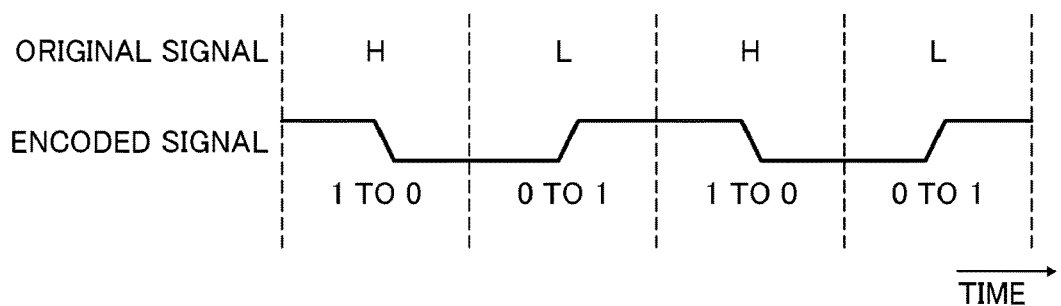
FIG. 12 is a diagram illustrating the waveform of data signals transmitted in the serial communication system illustrated in FIG. 1.

FIG. 12 is a diagram illustrating the waveform of data signals transmitted in the serial communication system illustrated in FIG. 1. The original signal is an idle signal or data signal before encoding. The bit of the high level (H) of the original signal is represented by the transition of "H to L" in the single cycle of an encoded signal. The bit of the low level (L) of the original signal is represented by the transition of "L to H" in the single cycle of an encoded signal.

The start bits in the frames illustrated in FIGS. 7 to 11 represent bits of the low level (L) of the data signal before encoding and accordingly are represented by the transition from an L interval to an H interval in the single cycle of an encoded signal. The end bits in the frames illustrated in FIGS. 7 to 11 represent bits of the high level (H) of the data signal before encoding and accordingly are represented by the transition from an H interval to an L interval in the single cycle of an encoded signal.

Figure 13:
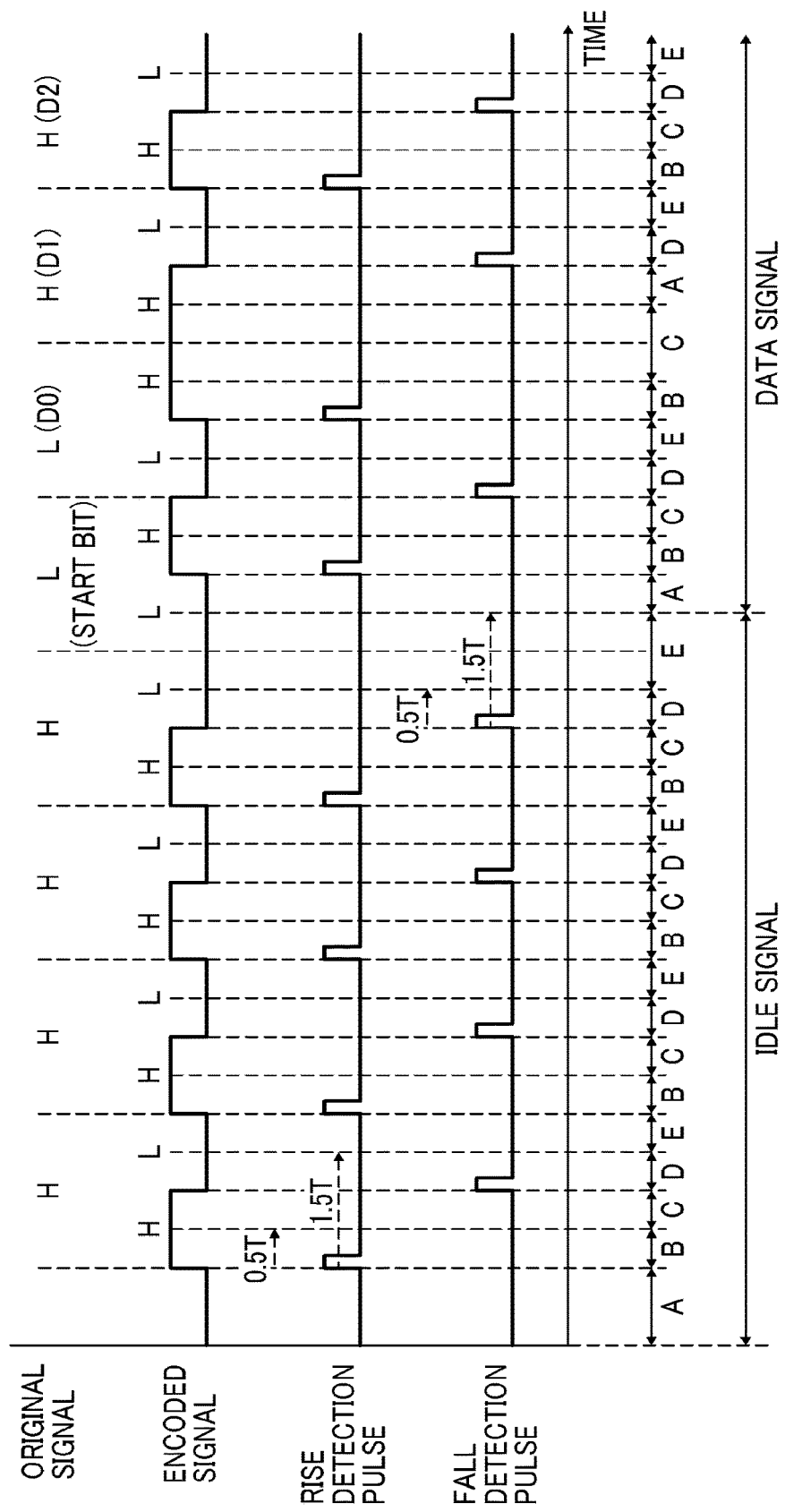
FIG. 13 is a timing diagram illustrating reception of data signals in the serial communication system illustrated in FIG. 1.
Figure 14:
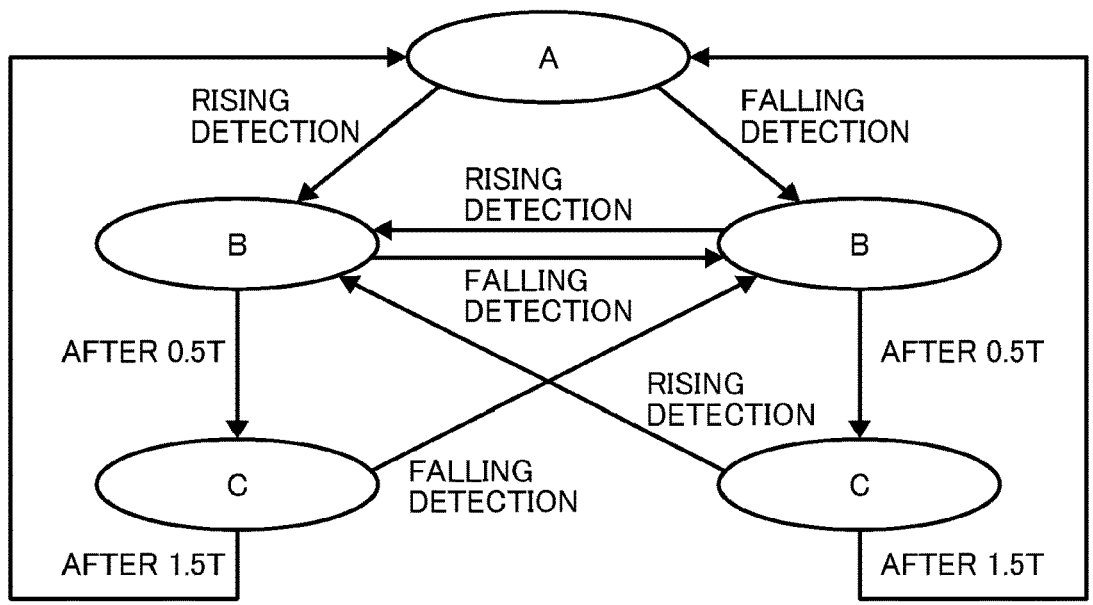
FIG. 14 is a state transition diagram illustrating the reception behavior of data signals transmitted in the serial communication system illustrated in FIG. 1.

FIG. 13 is a timing diagram illustrating reception of data signals in the serial communication system illustrated in FIG. 1. FIG. 14 is a state transition diagram illustrating the reception behavior of data signals transmitted in the serial communication system illustrated in FIG. 1. "A" "B", "C", "D", and "E" illustrated in FIG. 13 respectively represent states of "A" "B", "C", "D", and "E" illustrated in FIG. 14. The reception behavior of the interface circuit 4 is described below with reference to FIG. 13 and FIG. 14. As described above, the bit of the high level (H) of the data signal before encoding is represented by the transition of H to L in the single cycle of an encoded signal and the bit of the low level (L) of the data signal before encoding is represented by the transition from L to H in the single cycle of an encoded signal. Accordingly, this makes the maximum of the length of continuous high level or low level two-fold of the first interval length and the second interval length.

Hereinafter, the second interval length measured by the waveform measuring circuit 46 (which is the average Have of H interval lengths or the average Lave of L interval lengths, represented by the clock number of the clock signal CLK2) is represented as "T". The decoder 45 detects the level of the first encoded signal at a preset point of time from the rise or fall of the first encoded signal. The decoder 45 detects the level of the first encoded signal at the first point of time preset in a period from the rise or the fall of the first encoded signal to less than the second interval length from the rise or the fall. For example, the decoder 45 detects the level of the first encoded signal at 0.5 T (that is, Have/2 or Lave/2) from the rise or fall of the first encoded signal. The decoder 45 furthermore detects the level of the first encoded signal at the second point of time preset in a period from later than the second interval length from the rise or the fall of the first encoded signal to less than a twofold of the second interval length from the rise or the fall. For example, the decoder 45 detects the level of the first encoded signal at 1.5 T (that is, 3×Have/2 or 3×Lave/2) from the rise or fall of the first encoded signal. If another rise or fall is detected before 0.5 T or 1.5 T elapses from the rise or the fall of the first encoded signal, the decoder 45 resets the time to determine the elapse of 0.5 T or 1.5 T. The decoder 45 detects the level of the first encoded signal at 0.5 T or 1.5 T after the another rise or fall.

The decoder 45 in the interface circuit 4 decodes the first encoded signal to the first data signal by the following processing according to the state transition diagram illustrated in FIG. 14. The decoder 45 transits to the state A after resetting. The decoder 45 transits to the state B in the state A when a rise is detected and to the state D when a fall is detected. When 0.5 T elapses after the rise in the state B, the decoder 45 detects the first encoded signal at the high level and transits to the state C. The decoder 45 detects the first encoded signal still at the high level at 1.5 T in the state C after the rise and transits to the state A. The decoder 45 transits to the state D when a fall is detected in the state B and the state C. When 0.5 T elapses after the fall in the state D, the decoder 45 detects the first encoded signal at the low level and transits to the state E. When 1.5 T elapses after the fall in the state E, the decoder 45 detects the first encoded signal at the low level and transits to the state A. The decoder 45 transits to the state B when a rise is detected in the state D and the state E.

The decoder 45 detects the level of the first encoded signal at a point of time (0.5 T or 1.5 T) preset after the rise or fall of the first encoded signal. As described above, when each cycle of idle signals include the transition from H to L, a end bit includes the transition of from H to L, and a start bit includes a transition from L to H, the start bit of a data signal is detected by detecting continuous L intervals (L to L). The decoder 45 determines that the start bit has arrived when the state E transits to the state A illustrated in FIG. 14. Similarly, it is possible to detect the data bits D0 to D7, the parity bit, and the end bit of the data signal. The decoder 45 stands by detection of a start bit in the state A again after it has detected a end bit.

Figure 15:
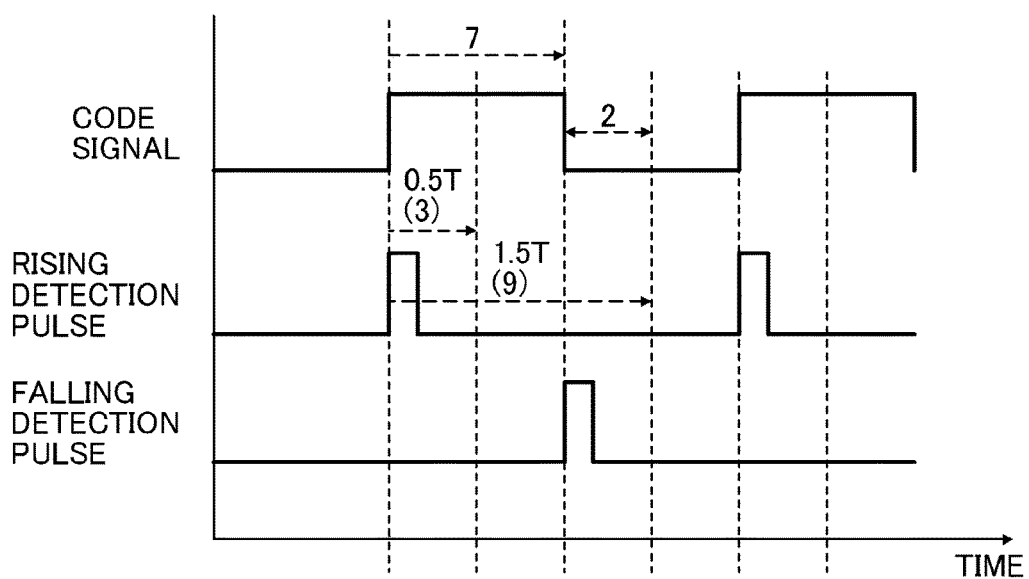
FIG. 15 is a timing diagram illustrating reception errors of data signals in the serial communication system illustrated in FIG. 1.

FIG. 15 is a timing diagram illustrating reception errors of data signals in the serial communication system illustrated in FIG. 1. For example, a case is described in which the clock frequency f1 of the clock signal CLK1 and the clock frequency f2 of the clock signal CLK2 are in the range of from 6 MHz to 15 MHz and the first interval length is 15 clocks (CLK1). In this case, the minimum of the second interval length T is 6 clocks (CLK2) (f1=15 MHz, f2=6 MHz) and the maximum is 38 clocks (CLK2) (f1=6 MHz, f2=15 MHz). The clock frequencies f1 and f2 change depending on changes of environment such as voltage of power supply and temperature. According to the circuit simulations, the clock frequencies f1 and f2 change in the range of from −6 percent to +3 percent according to the temperature change.

Considering the worst-case scenario, the clock frequency f1 or f2 is assumed to have shifted 10 percent since when the waveform measuring circuit 46 measures the second interval length T (training signal reception state FCNT_RX). First, a case is described in which the measured second interval length T is 6 clocks (FIG. 15). In this case, the actual second interval length shifts one clock (round-up of 10 percent of 6 clocks) at maximum from the second interval length T (6 clocks) measured before the frequency change, so that, for example, it becomes 7 clocks. The decoder 45 needs to identify 1.5 T (6×1.5=9 clocks) from a rise or a fall of the first encoded signal. In this case, there is a margin of 2 clocks (9−7=2 clocks) to the closest rise or fall at 9 clocks after the rise or fall. In addition, the decoder 45 needs to identify 0.5 T (6×0.5=3 clocks) from a rise or a fall of the first encoded signal. When detecting a non-continuous separated H interval or L interval (34 clock), there is a margin of 4 clocks (7−3=4 clocks) to the next following rise or fall at 3 clocks after the rise or fall.

Similarly, a case is described in which the measured second interval length T is 38 clocks. In this case, the actual second interval length shifts four clocks (round-up of 10 percent of 38 clocks) at maximum from the second interval length T (38 clocks) measured before the frequency change, so that, for example, it becomes 34 clocks. The decoder 45 needs to identify 1.5 T (38×1.5=57 clocks) from the rise or the fall of the first encoded signal to detect two continuous H intervals or L intervals (34×2=68 clocks). In this case, there is a margin of 11 clocks to the following rise or fall at 57 clocks after the rise or fall. In addition, the decoder 45 needs to identify 0.5 T (38×0.5=19 clocks) from a rise or a fall of the first encoded signal. When detecting a non-continuous separated H interval or L interval (34 clocks), there is a margin of 15 clocks to the following rise or fall at 19 clocks after the rise or fall.

For example, when the clock frequency f1 and the clock frequency f2 are in the range of from 6 MHz to 15 MHz and the first interval length is 15 clocks (CLK1), it is possible to receive an encoded signal without an error even if the clock frequency f1 or the clock frequency f2 changes 10 percent after the second interval length T is measured.

That is, as described above, it is possible to conduct data communications correctly by the serial communication system illustrated in FIG. 1 even if the accuracy of the clock frequency f1 and the clock frequency f2 is low and changes depending on the environment.

The serial communication system illustrated in FIG. 1 transmits training signals and data signals in the dual direction but possibly transmits them in one way direction. For example, when conducting one-way communications from the interface circuit 2 to the interface circuit 4, it is possible to remove the receiver 24, the decoder 25, and the waveform measuring circuit 26 of the interface circuit 2 and the encoder 42 and the driver 43 of the interface circuit 4. In the interface circuit 2, the controller 21 generates a training signal having an H interval and an L interval in a single cycle, each having the first interval length of a preset clock number based on the first clock signal CLK 1. The encoder 22 and the driver 23 transmit the training signal to the interface circuit 4.

In the interface circuit 4, the receiver 44 receives the training signal from the interface circuit 2. The waveform measuring circuit 46 measures a second interval length indicating the clock number of the H interval and the L interval contained in the single cycle of the training signal based on the second clock signal CLK2. In the interface circuit 2, the encoder 22 encodes data signal and generates an encoded signal having an H interval and an L interval in a single cycle, each having the first interval length. The encoded signal represents a single bit of the data signal by transition between the H interval and the L interval in the single cycle. The driver 23 transmits the encoded signal to the interface circuit 4. In the interface circuit 4, the receiver 44 receives the encoded signal from the interface circuit 2. The decoder 45 decodes the data signal from the encoded signal in the following manner. The decoder 45 detects the level of the encoded signal at the first point of time preset in a period from the rise or the fall of the encoded signal to less than the second interval length from the rise or the fall. The decoder 45 furthermore detects the level of the encoded signal at the second point of time preset in a period from later than the second interval length from the rise or the fall of the first encoded signal to less than a twofold of the second interval length from the rise or the fall.

In the serial communication system illustrated in FIG. 1, the interface circuit 2 and the interface circuit 4 respectively have the self-oscillation circuit 27 and the self-oscillation circuit 47 but may receive the clock signals CLK1 and the CLK2 from a clock signal source outside.

Figure 16:
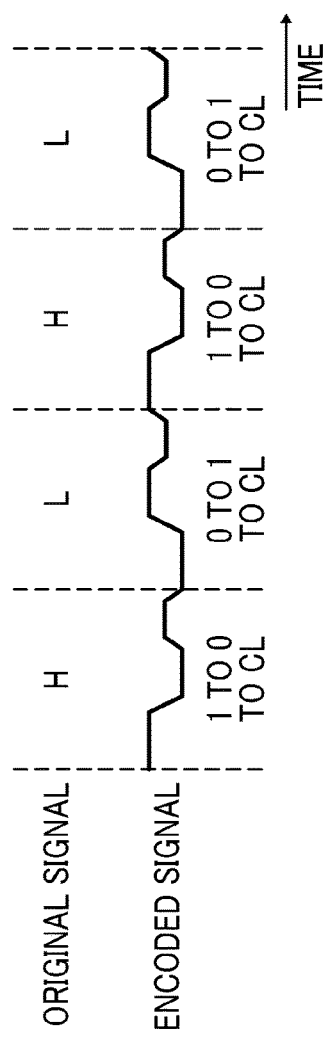
FIG. 16 is a diagram illustrating the waveform of data signals transmitted in the serial communication system related to a first variation of the first embodiment of the present disclosure.

FIG. 16 is a diagram illustrating the waveform of data signals transmitted in the serial communication system related to a first variation of the first embodiment of the present disclosure. The encoding method of data signals is not limited to binary encoding method as illustrated in FIG. 12. An encoding method of three or more values can be also used. FIG. 16 illustrates the original signal (idle signal or data signal before encoding) relating to three value encoding method and a waveform of the encoded signal. The encoded signal includes an H interval (1), an L interval (0), and a common mode level interval having a level between the H interval and the L interval in one cycle. Using a driver capable of outputting the common mode level and a receiver capable of detecting the common mode level makes it possible to conduct three value encoding method communications. Since a bit boundary can be recognized by inserting a common mode level interval in one cycle of the encoded signal, the probability of detection error of bit boundary decreases.

Multiple encoding methods can be selectively used for the interface circuit 2 and the interface circuit 4. The encoding method can be changed depending on the transmission rate capability of a serial communication system or communications environment. It is possible to reduce error detection by representing a single bit of a data signal by more bits of an encoded signal to increase rises and falls. In addition, propagation property can be improved by combining with an AC coupling (illustrated in FIG. 18) described later.

Figure 17:
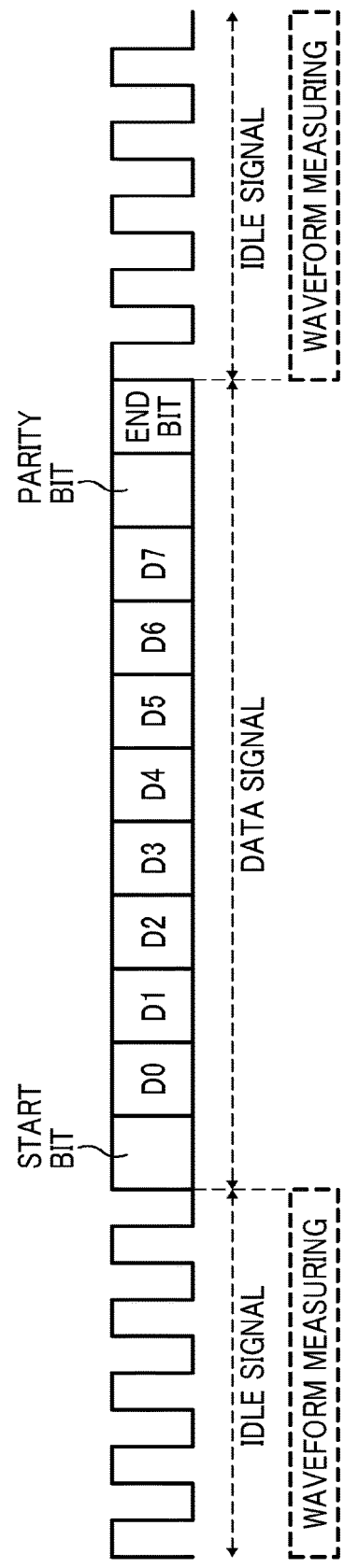
FIG. 17 is a diagram illustrating the format of data signals transmitted in the serial communication system related to the first variation of the first embodiment of the present disclosure.

FIG. 17 is a diagram illustrating the format of data signals transmitted in the serial communication system related to the first variation of the first embodiment of the present disclosure. Idle signals are transmitted before and after the data signal. The idle signal has the same format as the first and the second training signals. Therefore, the second interval length and the fourth interval length can be measured based on not only the first and the second training signals (training signal reception state FCNT_RX) but also the idle signal.

In the interface circuit 2, the encoder 22 generates an encoded signal including a training interval (idle signal) having an H interval and an L interval in a single cycle, each having the first interval length. In the interface circuit 4, the waveform measuring circuit 46 measures the second interval length indicating the clock number of the H interval and the L interval contained in the single cycle of the training interval based on the second clock signal CLK2. Similarly, in the interface circuit 4, the encoder 42 generates an encoded signal including a training interval (idle signal) having an H interval and an L interval in a single cycle, each having the third interval length. In the interface circuit 2, the waveform measuring circuit 26 measures a fourth interval length indicating the clock number of the H interval and the L interval contained in a single cycle of the training interval based on the first clock signal CLK1.

The second and the fourth interval lengths are updated reflecting the measuring result of the idle signals. The update method can be arbitrarily selected from the following.
1. The average of the previously measured interval length and the newly measured interval length is defined as the new interval length
2. If the difference between the average of the previously measured interval length and the newly measured interval length is not less than a preset value, the interval length is updated
3. If the difference between the average of the previously measured interval length and the newly measured interval length is not greater than a preset value, the interval length is updated
4. The previously measured interval length is updated with the newly measured interval length every time When idle signals are added before and after a data signal and transmitted to measure the second interval length or the fourth interval length by the idle signals, the first interval length or the third interval length can be changed tracing the changes of the clock frequency f1 and the clock frequency f2 ascribable to environmental change. Since the idle signal is always ahead of the data signal, the second interval length or the fourth interval signal is measured again before transmission of the data signal, the first interval length or the third interval length can be changed tracing the change of the voltage and temperature.

Second Embodiment

Figure 18:
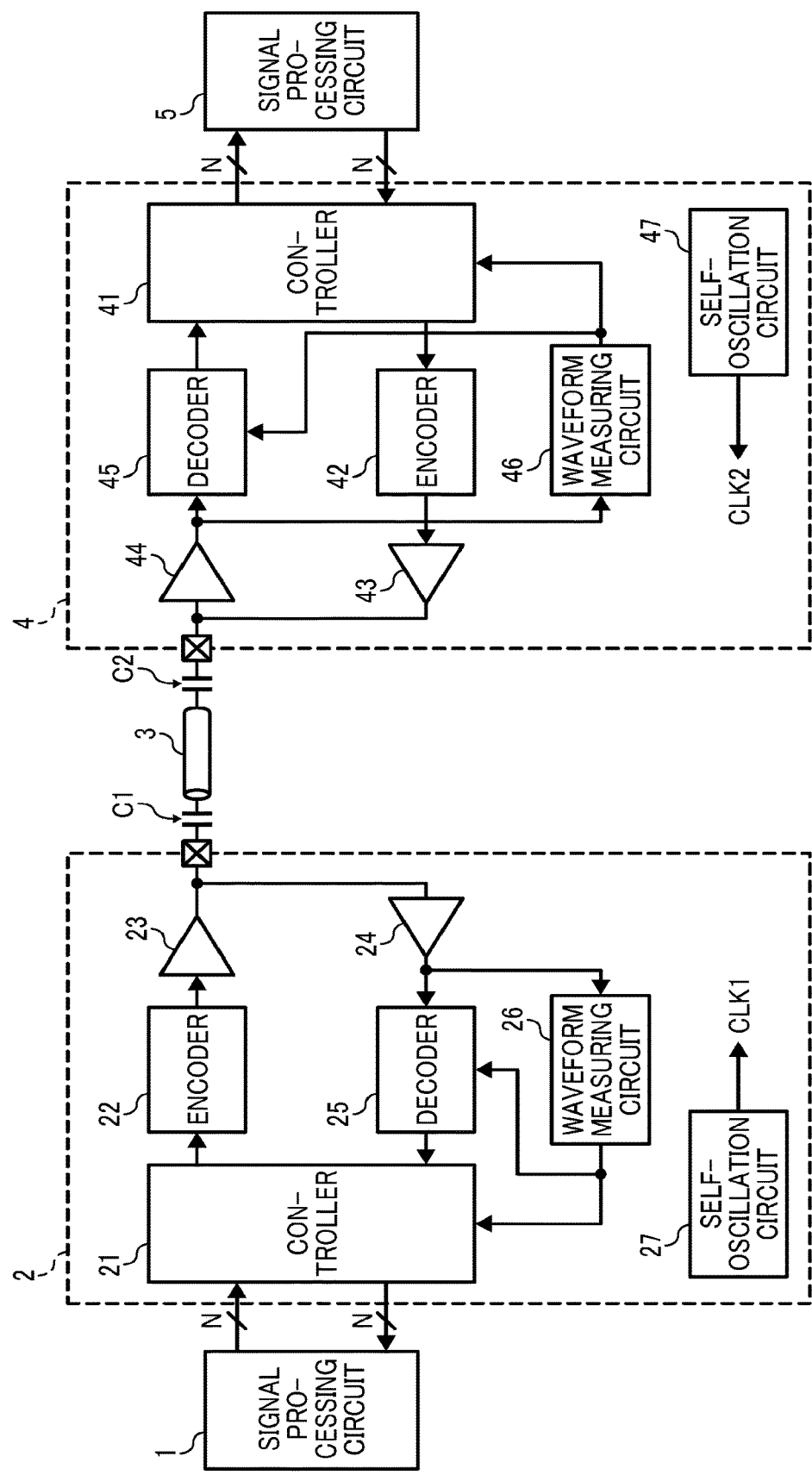
FIG. 18 is a block diagram illustrating the configuration of a serial communication system according to a second embodiment of the present disclosure.

FIG. 18 is a block diagram illustrating the configuration of a serial communication system according to a second embodiment of the present disclosure. The serial transmission line 3 can be AC-coupled with at least one of the interface circuit 2 and the interface circuit 4.

In FIG. 18, a capacitor C1 and a capacitor 2 are provided on both ends of the serial transmission line 3. This AC coupling obviates the need for matching the common mode levels of the interface circuit 2 and the interface circuit 4.

Third Embodiment

Figure 19:
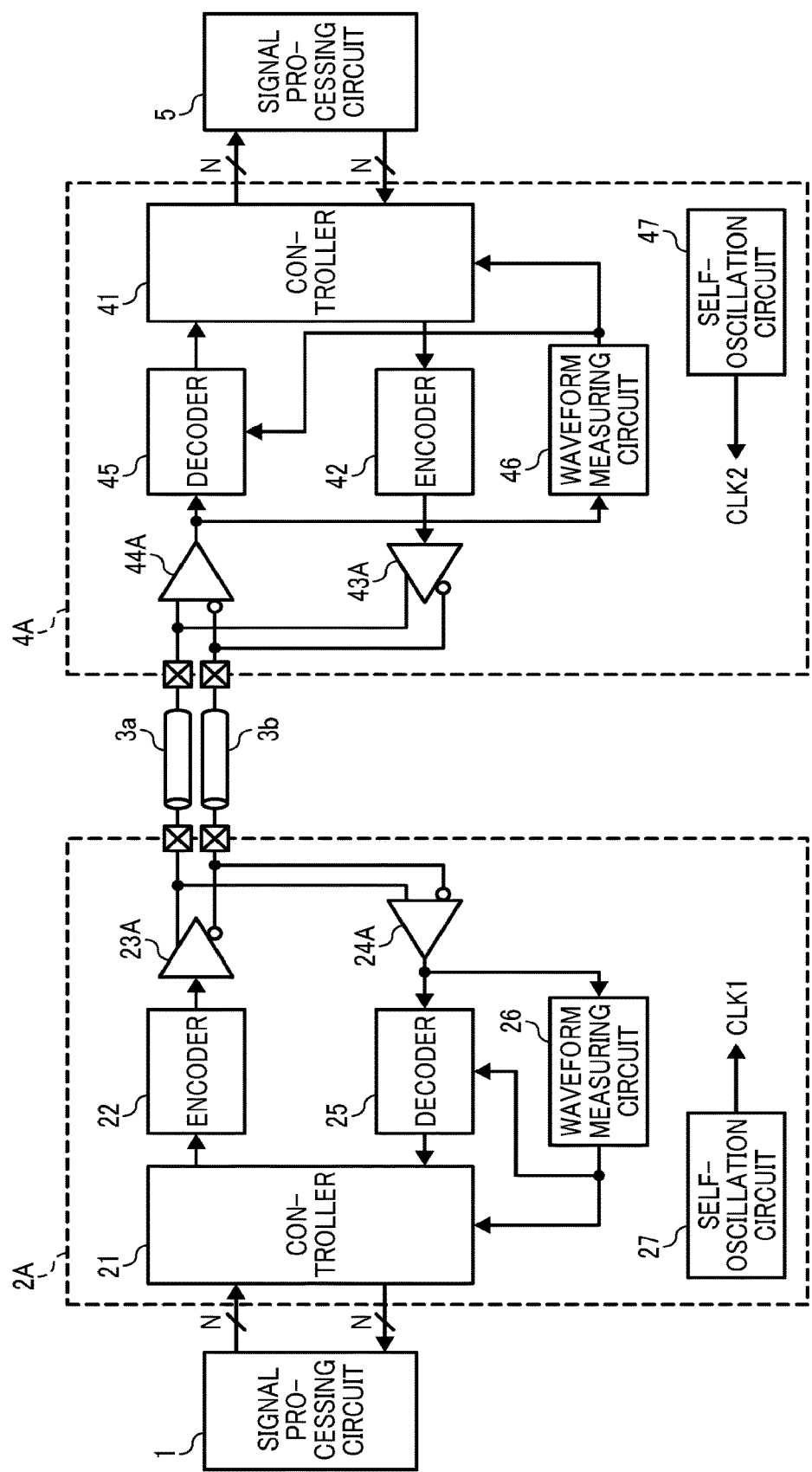
FIG. 19 is a block diagram illustrating the configuration of a serial communication system according to a third embodiment of the present disclosure.

FIG. 19 is a block diagram illustrating the configuration of a serial communication system according to a third embodiment of the present disclosure. The serial communications system illustrated in FIG. 19 includes the signal processing circuit 1, an interface circuit 2A, differential serial transmission lines 3a and 3b, an interface circuit 4A, and the signal processing circuit 5. The interface circuit 2A includes a differential driver 23A and a differential receiver 24A instead of the driver 23 and the receiver 24 illustrated in FIG. 1. The interface circuit 4A includes a differential driver 43A and a differential receiver 44A instead of the driver 43 and the receiver 44 illustrated in FIG. 1. By the communications through differential signals, the system is strong against noises at the voltage of the power supply and earth voltage.

Fourth Embodiment

Figure 20:
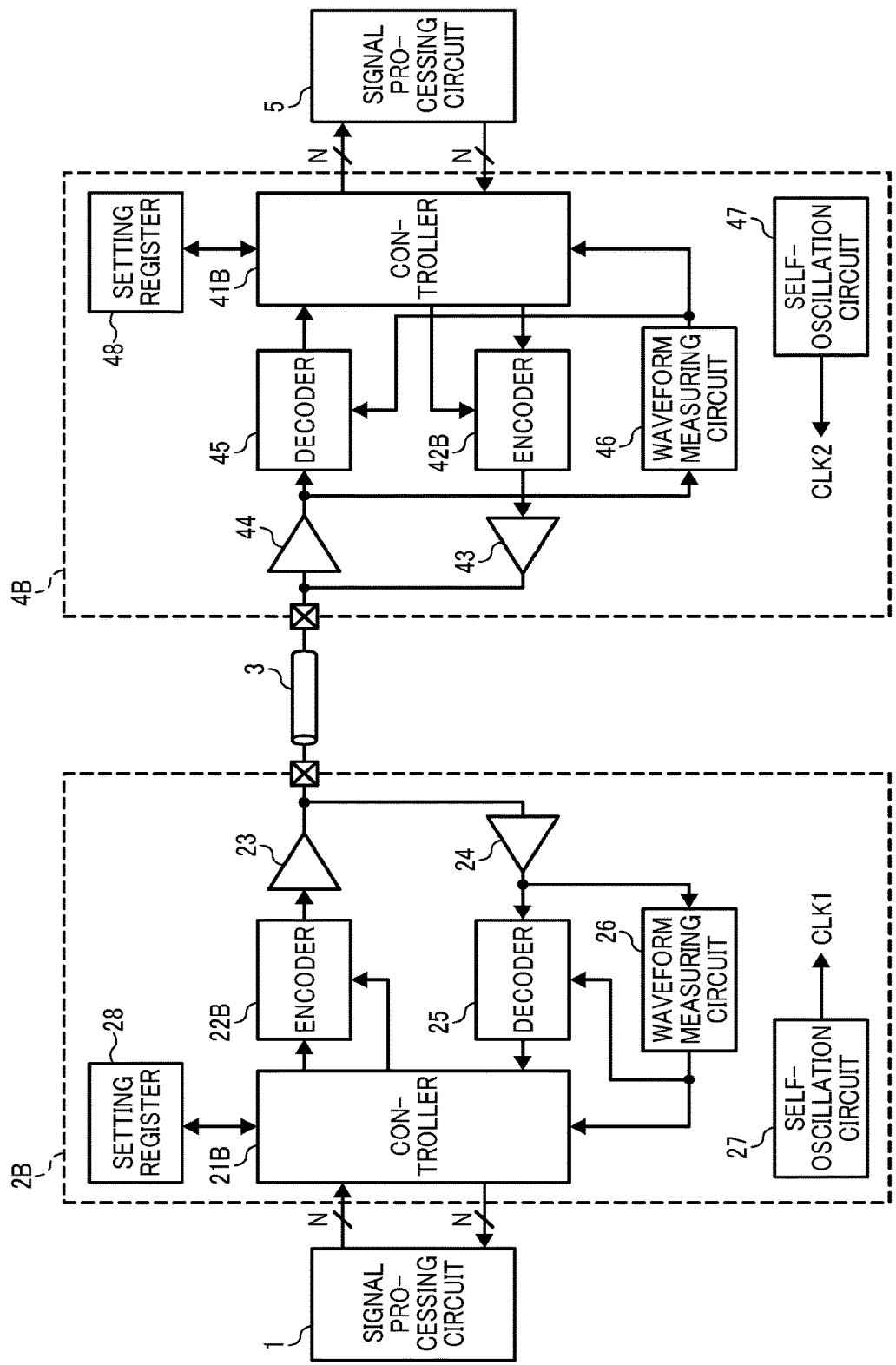
FIG. 20 is a block diagram illustrating the configuration of a serial communication system according to a fourth embodiment of the present disclosure.

FIG. 20 is a block diagram illustrating the configuration of a serial communication system according to a fourth embodiment of the present disclosure. The serial communication system illustrated in FIG. 20 includes the signal processing circuit 1, an interface circuit 2B, the serial transmission line 3, an interface circuit 4B, and the signal processing circuit 5. The interface circuit 2B includes a controller 21B and an encoder 22B instead of the controller 21 and the encoder 22 illustrated in FIG. 1 and furthermore a setting register 28. The interface circuit 4B includes a controller 41B and an encoder 42B instead of the controller 41 and the encoder 42 illustrated in FIG. 1 and furthermore a setting register 48. The first interval length (interval length when the encoder 22B encodes the first training signal and the first data signal) is set in the setting register 28. The first interval length is changeable by the controller 21B (or another controller). The third interval length (interval length when the encoder 42B encodes the second training signal and the second data signal) is set in the setting register 48. The third interval length is changeable by the controller 41B (or another controller).

The clock frequencies f1 and the f2 may be same or different. In addition, the time length of the H interval and the L interval of the training signal and the encoded signal is determined by (1/f1)×the first interval length and (1/f2)× the third interval length. When the first interval length or the third interval length is constant, as the clock frequency is high, the time length of the H interval and L interval of the training signal and the encoded signal decreases. When the training signal and the encoded signal transmitted from the interface circuit having a higher clock frequency is received in the interface circuit having a lower clock frequency, the measured H interval length and L interval length also become shorter. Accordingly, the breakdown power is insufficient when the training signal and the encoded signal are received. The accuracy deteriorates when the level of the first encoded signal is detected at preset points (0.5 T, 1.5 T) of time from the rise of the fall of the first encoded signal, thereby increasing the probability of detection error.

To solve the problem caused by the difference between the clock frequency f1 and the clock frequency f2, the serial communication system illustrated in FIG. 20 operates in the following manner. In the interface circuit 2B, the controller 21B increases the first interval length when the first interval length is shorter than the fourth interval length.

The controller 21B stores the changed set value of the first interval length in the setting register 28. In the interface circuit 4B, the controller 41B increases the third interval length when the third interval length is shorter than the second interval length. The controller 41B stores the changed set value of the third interval length in the setting register 48.

To solve the problem ascribable to the difference between the clock frequency f1 and the clock frequency f2, the serial communication system illustrated in FIG. 20 may furthermore include a third controller provided outside for the interface circuit 2B and the interface circuit 4B. The serial communication system uses, for example, the signal processing circuit 1 as the third controller provided outside for the interface circuit 2B and the interface circuit 4B. The signal processing circuit 1 acquires the first interval length stored in the setting register 28 and the fourth interval length measured by the waveform measuring circuit 26 from the interface circuit 2B. The signal processing circuit 1 increases the first interval length when the first interval length is shorter than the fourth interval length. The controller 21B stores the changed set value of the first interval length in the setting register 28 under the control of the signal processing circuit 1.

The signal processing circuit 1 may further acquire the third interval length stored in the setting register 48 and the second interval length measured by the waveform measuring circuit 46 from the interface circuit 4B via the serial transmission line 3 and the interface circuit 2B. The signal processing circuit 1 increases the third interval length when the third interval length is shorter than the second interval length. The controller 41B stores the changed set value of the third interval length in the setting register 48 under the control of the signal processing circuit 1.

When the fluctuating frequency range of the clock frequency f1 and the clock frequency f2 is known, the controller 21B and the controller 41B are able to set a suitable first interval length and a suitable third interval length in the frequency range to transmit data signals.

Fifth Embodiment

Figure 21:
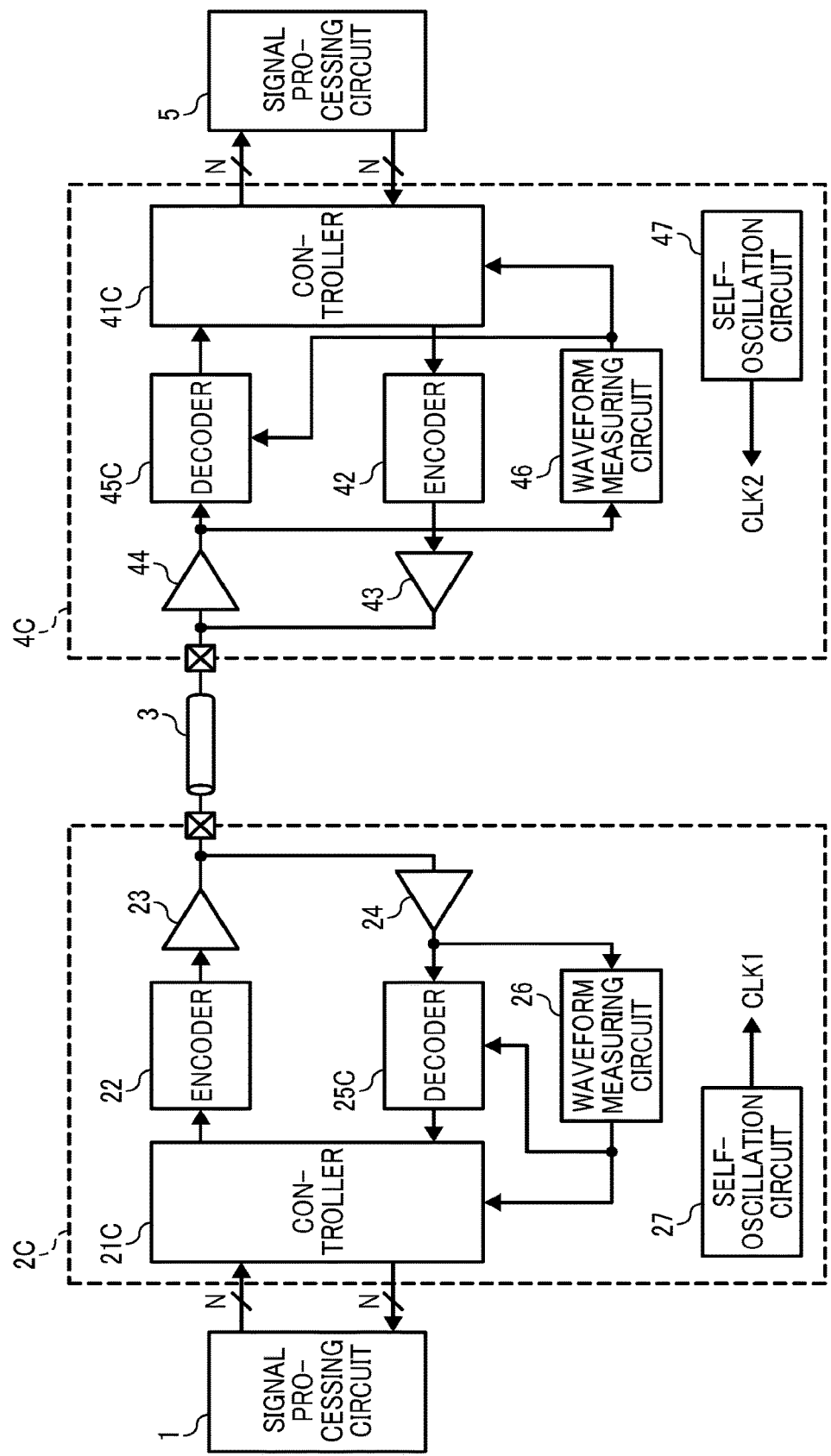
FIG. 21 is a block diagram illustrating the configuration of a serial communication system according to a fifth embodiment of the present disclosure.

FIG. 21 is a block diagram illustrating the configuration of a serial communication system according to a fifth embodiment of the present disclosure. The serial communication system illustrated in FIG. 21 includes the signal processing circuit 1, an interface circuit 2C, the serial transmission line 3, an interface circuit 4C, and the signal processing circuit 5. The interface circuit 2C includes a controller 21C and a decoder 25C instead of the controller 21 and the encoder 25 illustrated in FIG. 1. The interface circuit 4C includes a controller 41C and a decoder 45C instead of the controller 41 and the decoder 45 illustrated in FIG. 1.

Figure 22:
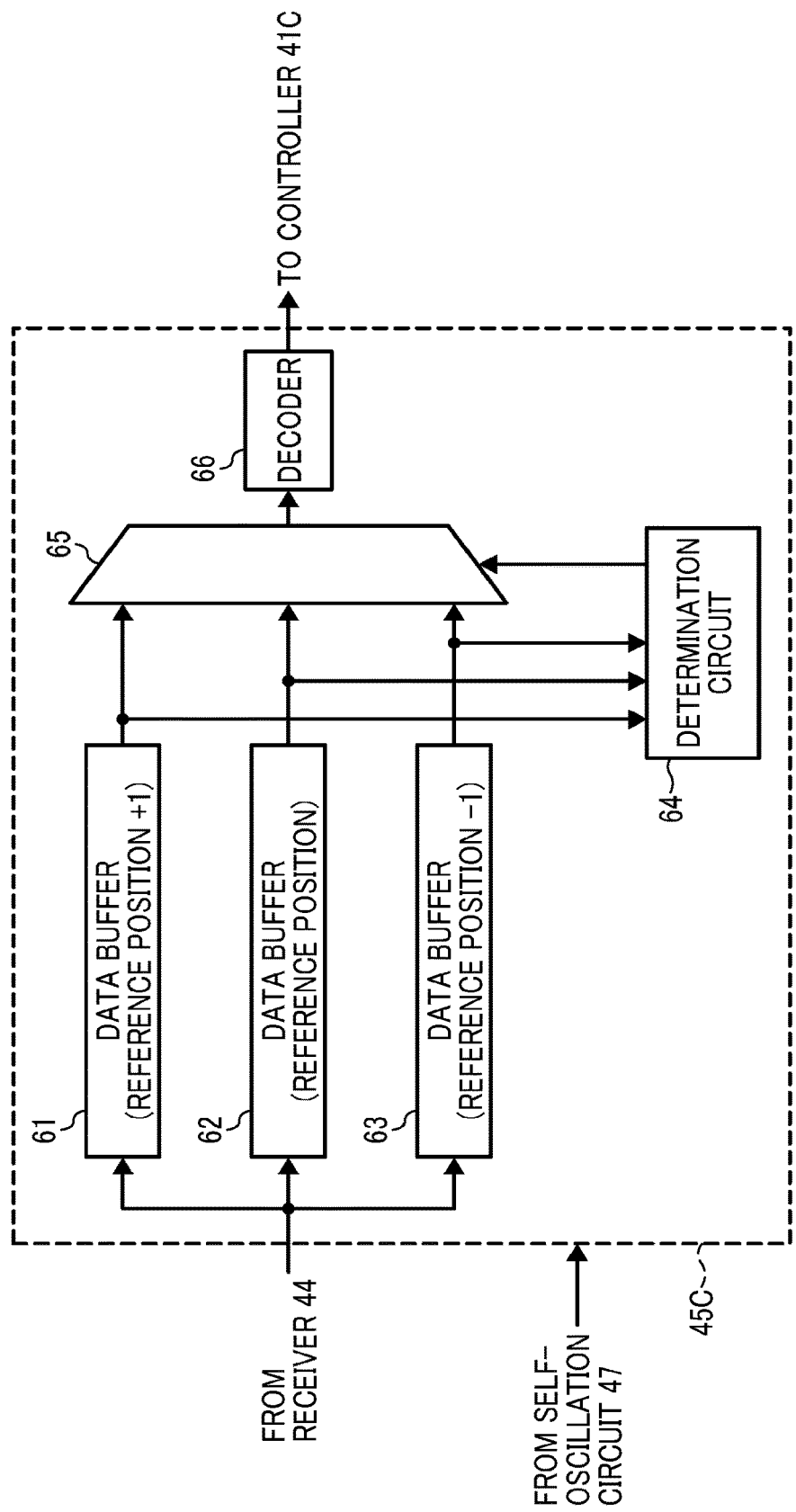
FIG. 22 is a block diagram illustrating the configuration of a decoder 45C illustrated in FIG. 21.

FIG. 22 is a block diagram illustrating the configuration of the decoder 45C illustrated in FIG. 21. The decoder 45C includes data buffers 61, 62, and 63, a determination circuit 64, a selector 65, and a decoder 66. The data buffers 61, 62, and 63, the determination circuit 64, and the selector 65 operate as a parity check circuit. The data buffer 62 stores the first encoded signal at a point of time preset in a period less than the second interval length from the rise or fall of the first encoded signal. The preset point of time is, for example, 0.5 T or 1.5 T, which is set as a reference.

The data buffers 61 and the 63 store the first encoded signal at one clock before or after the reference position based on the clock signal CLK2. The determination circuit 64 executes parity check processing illustrated in FIG. 23 and sends the correct one of the first encoded signals stored in the data buffers 61 to 63 to the decoder 66. The decoder 66 operates in the same manner as the decoder 45 illustrated in FIG. 1.

In the interface circuit 2C, the encoder 22 adds a parity bit to the data signal for encoding and generates an encoded signal including the parity bit. In the interface circuit 4C, when the parity check of the encoded signal indicates an error, the decoder 45C shifts the first point of time and the second point of time over the preset clock number of the clock signal CLK2 forward or backward.

Figure 23:
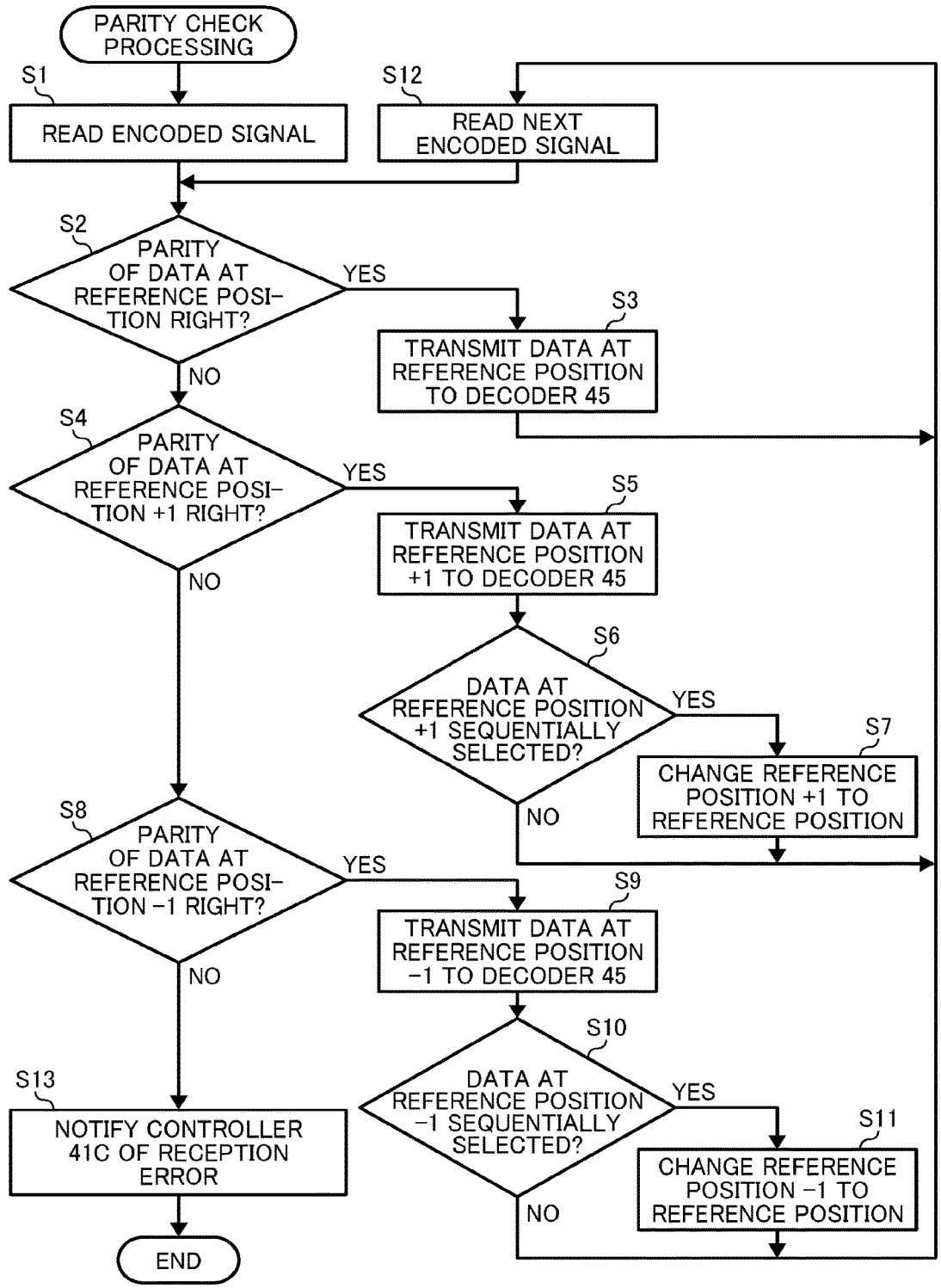
FIG. 23 is a flow chart illustrating parity check processing executed by a determination circuit 64 illustrated in FIG. 22.

FIG. 23 is a flow chart illustrating a parity check processing executed by the determination circuit 64 illustrated in FIG. 22. The determination circuit 64 determines whether or not the parity (even-odd) of the number of "1" in the portion deducted as the data bits D0 to D7 matches the value of the portion deduced as the parity bit in the encoded signal corresponding to the frame (FIG. 7) of the data signal. In the step S1, the determination circuit 64 reads encoded signals from the data buffers 61 to 63. In the step S2, the determination circuit 64 determines whether or not the parity of the data at the reference position is correct, and proceeds to S3 when Yes, and S4, when No.

In the step S3, the determination circuit 64 transmits the data at the reference position to the decoder 45 and proceeds to the step S12. In the step S4, the determination circuit 64 determines whether or not the parity of the data at the reference position +1 is correct, and proceeds to S5 when Yes, and S8, when No. In the step S5, the determination circuit 64 transmits the data at the reference position +1 to the decoder 45. In the step S6, the determination circuit 64 determines whether or not the data at the reference position +1 are continuously selected a preset number of times, and proceeds to S7 when Yes, and S12, when No. In the step S7, the determination circuit 64 delays the reference position by one clock and proceeds to the step S12. In the step S8, the determination circuit 64 determines whether or not the parity of the data at the reference position −1 is correct, and proceeds to S9 when Yes, and S13, when No. In the step S9, the determination circuit 64 transmits the data at the reference position −1 to the decoder 45. In the step S10, the determination circuit 64 determines whether or not the data at the reference position −1 are selected for a preset number of times, and proceeds to S11 when Yes, and S12, when No. In the step S11, the determination circuit 64 moves up the reference position by one clock and proceeds to the step S12. In the step S12, the determination circuit 64 reads encoded signals from the data buffers 61 to 63. In the step S13, the determination circuit 64 notifies the controller 41C of a reception error.

According to the parity check of FIG. 23, when the parity check of the first encoded signal at the reference position is not good, the parity of the first encoded signal is checked at one clock before and after the reference position. When there is no error, the first encoded signal at one clock before or after the reference position is transmitted to the decoder 66 and the first encoded signal is received. When the parity check is not good at the reference position but good at one clock before or after the reference point and continuously good at one clock before or after the reference position a preset number of times, the point of time is updated as a new reference position. According to the parity check illustrated in FIG. 23, the reference position can be continuously corrected.

The decoder 25C illustrated in FIG. 21 has the same configuration as the decoder 45C illustrated in FIG. 22 and executes the parity check illustrated in FIG. 23.

According to the serial communication system illustrated in FIG. 21, detection error can be avoided even when the second interval length and the fourth interval length change about time or noises abruptly occur.

Sixth Embodiment

Figure 24:
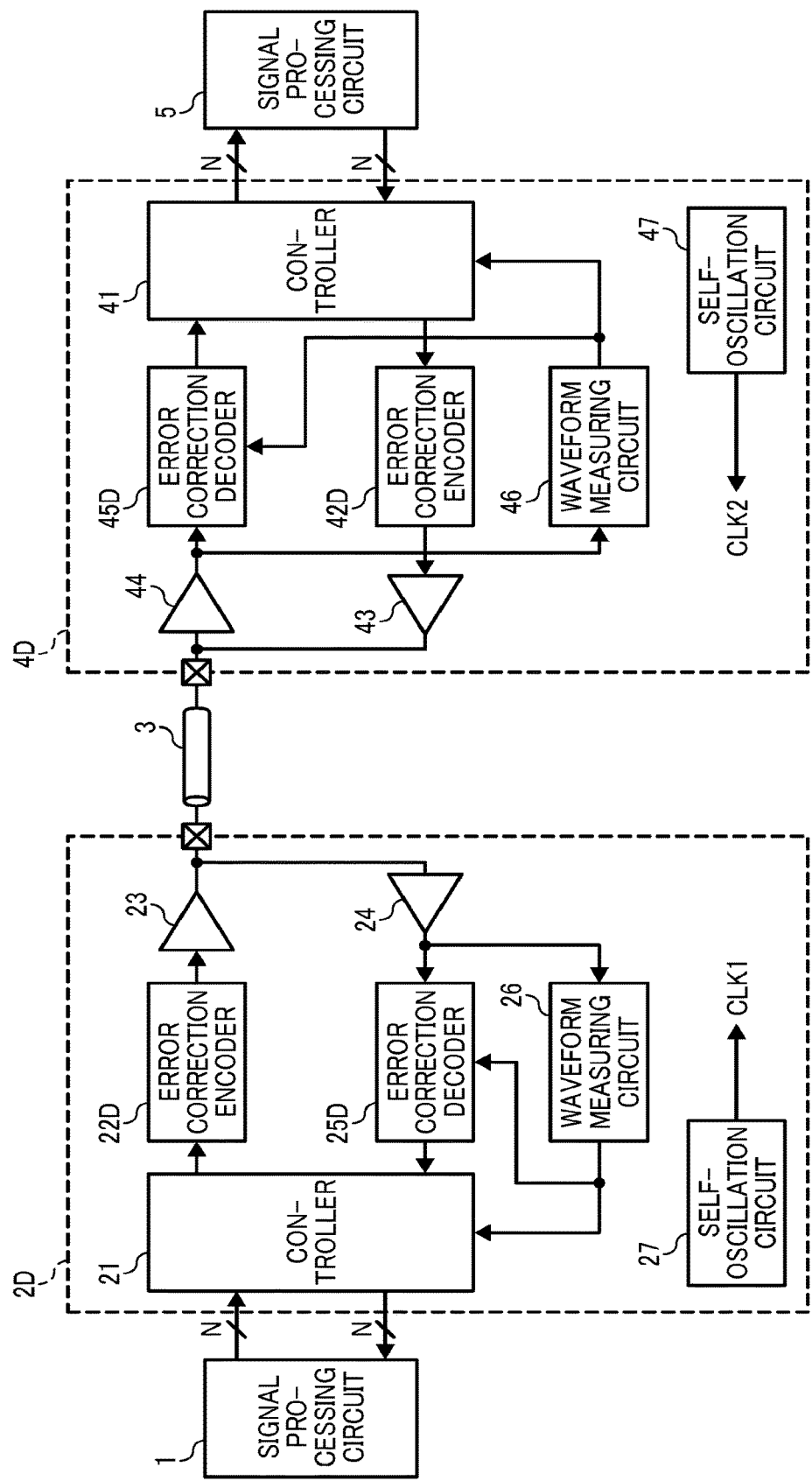
FIG. 24 is a block diagram illustrating the configuration of a serial communication system according to a sixth embodiment of the present disclosure.

FIG. 24 is a block diagram illustrating the configuration of a serial communication system according to a sixth embodiment of the present disclosure. The serial communication system illustrated in FIG. 24 includes the signal processing circuit 1, an interface circuit 2D, the serial transmission line 3, an interface circuit 4D, and the signal processing circuit 5. The interface circuit 2D has an error correction encoder 22D and an error correction decoder 25D instead of the encoder 22 and the decoder 25 illustrated in FIG. 1. The interface circuit 4D has an error correction encoder 42D and an error correction decoder 45D instead of the encoder 42 and the decoder 45 illustrated in FIG. 1.

In the interface circuit 2D, the error correction encoder 22D adds an error correction code to the data signal for encoding and generates an encoded signal including the error correction code. In the interface circuit 4D, the error correction decoder 45D corrects the error of the encoded signal based on the error correction code. Similarly, in the interface circuit 4D, the error correction encoder 42D adds an error correction code to the data signal for encoding and generates an encoded signal including the error correction code. In the interface circuit 2D, the error correction decoder 25D corrects the error of the encoded signal based on the error correction code.

FIG. 25 is a diagram illustrating the waveform of data signals transmitted in the serial communication system illustrated in FIG. 24. The frame illustrated in FIG. 25 includes error correction bits ECC0, ECC1, ECC2, and ECC3 instead of the parity bits illustrated in FIG. 7. By the error correction bits ECC0, ECC1, ECC2, and ECC3, errors can be corrected to two bit errors.

According to the serial communication system illustrated in FIG. 24, the frequency of error detection can be lowered because bit errors are corrected.

Seventh Embodiment

Figure 26:
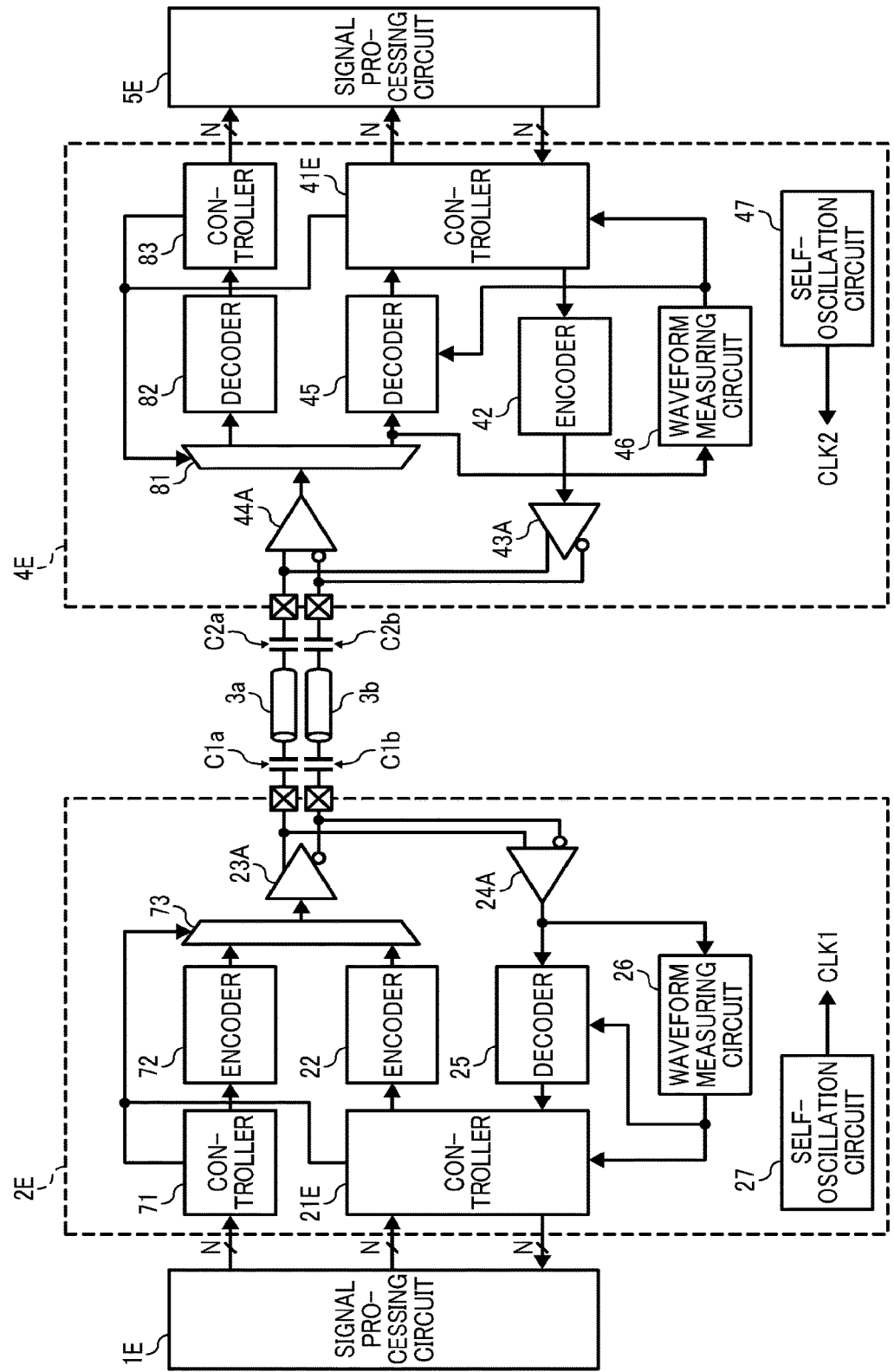
FIG. 26 is a block diagram illustrating the configuration of a serial communication system according to a seventh embodiment of the present disclosure.

FIG. 26 is a block diagram illustrating the configuration of a serial communication system according to a seventh embodiment of the present disclosure. The serial communication system illustrated in FIG. 26 includes a signal processing circuit 1E, an interface circuit 2E, serial transmission lines 3a and 3b, an interface circuit 4E, and a signal processing circuit 5E. The interface circuit 2E includes a controller 21E instead of the controller 21 of the interface circuit 2A illustrated in FIG. 19 and furthermore a controller 71, an encoder 72, and a selector 73. The interface circuit 4E includes a controller 41E instead of the controller 41 of the interface circuit 4A illustrated in FIG. 19 and furthermore a selector 81, a decoder 82, and a controller 83. A capacitor C1a, a capacitor C1b, a capacitor C2a, and a capacitor C2b are provided at each end of the serial transmission lines 3a and 3b.

In the interface circuit 2E, the controller 21E, the encoder 22, and the decoder 25 are for low speed communications and the controller 71 and the encoder 72 are for high speed communications. The selector 73 transmits encoded signals encoded at the encoder 22 or 72 to the driver 23A under the control of the controller 21E and 71. In the interface circuit 4E, the controller 41E, the encoder 42, and the decoder 45 are for low speed communications and the decoder 82 and the controller 83 are for high speed communications. The selector 81 transmits encoded signals received at the receiver 44A to the decoder 45 or 82 under the control of the controller 41E and 83.

The serial communication system illustrated in FIG. 26 does not conduct a single serial communication but is a specific implementation example in which high speed serial communications for image data, etc. and low speed serial communications for others share transmission lines. To transmit high speed serial signals, transmission lines are differentiated and AC coupled. The serial communication system illustrated in FIG. 26 conducts high speed serial communications to transmit image data and transmits other data signals (such as command for scanner setting) in the reverse direction to the transmission direction of the image data in the intervals (between sheets in the case of a multi-functional printer (MFP)) where no image data are being transmitted.

The serial communication system illustrated in FIG. 26 can be applied to a vehicle-mounted camera, a multi-functional printer (transmission of image data for write and read), etc. and is advantageous in particular where the cost can be reduced by decreasing the number of transmission lines if they are long.

The configurations of the serial communication systems according to the first to the seventh embodiment of the present disclosure can be combined.

The serial communication system relating to embodiments of the present disclosure has the following configuration.

The serial communication system of the first embodiment of the present disclosure includes a first communication device and a second communication device connected to the first communication device through a serial transmission line. The first communication device operates in response to a first clock signal having a first clock frequency and the second communication device operates in response to a second clock signal having a second clock frequency.

The first communication device generates a first training signal including a high level interval and a low level interval in a single cycle, each having a first interval length having a clock number set in advance, transmits the first training signal to the second communication device, encodes a first data signal to generate a first encoded signal including the high level interval and the low level interval in the single cycle, each having the first interval length, and transmits the first encoded signal to the second communication device. The first encoded signal represents a single bit of the first data signal by transition between the high level interval and the low level interval in the single cycle. The second communication device receives the first training signal from the first communication device, measures a second interval length representing the clock number of the high level interval and the low level interval in the single cycle of the first training signal based on the second clock signal, receives the first encoded signal from the first communication device, and decodes the first data signal from the first encoded signal by detecting the level of the first encoded signal at a first point of time preset in a period from a rise or a fall of the first encoded signal to less than the second interval length from the rise or the fall and a second point of time preset in a period from later than the second interval length from the rise or the fall of the first encoded signal to less than a twofold of the second interval length from the rise or the fall.

The serial communication system of the second embodiment of the present disclosure is that, in the serial communication system of the first embodiment of the present disclosure, the first communication device adds a parity bit to the first data signal for encoding and generates a first encoded signal including the parity bit, and the second communication device shifts the first point of time and the second point of time forward or backward over a preset clock number of the second clock signal when a parity check of the first encoded signal including the parity bit is an error.

The serial communication system of the third embodiment of the present disclosure is that, in the serial communication system of the first or second embodiment of the present disclosure, the first encoded signal further includes a common mode level interval having a level between the high level interval and the low level interval in the single cycle. The serial communication system of the fourth embodiment of the present disclosure is that, in any one of the serial communication system of the first to third embodiments of the present disclosure, the first communication device generates a first encoded signal including a training interval including the high level interval and the low level interval each having the first interval length in a single cycle and the second communication device measures the second interval length representing the clock number of the high level interval and the low level interval contained in the single cycle of the training interval based on the second clock signal.

The serial communication system of the fifth embodiment of the present disclosure is that, in any one of the serial communication system of the first to fourth embodiments of the present disclosure, the serial transmission line is a differential transmission line.

The serial communication system of the sixth embodiment of the present disclosure is that, in any one of the serial communication system of the first to fifth embodiments of the present disclosure, the serial transmission line is AC connected with either or both of the first communication device and the second communication device.

The serial communication system of the seventh embodiment of the present disclosure is that, in any one of the serial communication system of the first to sixth embodiments of the present disclosure, the first communication device adds an error correction code to the first data signal to generate a first encoded signal including the error correction code, and the second communication device corrects an error of the first encoded signal including the error correction code based on the error correction code.

The serial communication system of the eighth embodiment of the present disclosure is that, in any one of the serial communication system of the first to seventh embodiments of the present disclosure, the second communication device generates a second training signal including a high level interval and a low level interval in a single cycle, each having a third interval length having a preset clock number, transmits the second training signal to the first communication device, encodes a second data signal to generate a second encoded signal including the high level interval and the low level interval in the single cycle, each having the third interval length, and transmits the second encoded signal to the first communication device, the second encoded signal represents a single bit of the second data signal by transition between the high level interval and the low level interval in the single cycle, and the first communication device receives the second training signal from the second communication device, measures a fourth interval length representing a clock number of the high level interval and the low level interval in the single cycle of the second training signal based on the first clock signal, receives the second encoded signal from the second communication device, and decodes the second data signal from the second encoded signal by detecting a level of the second encoded signal at a third point of time preset in a period from less than the fourth interval length from a rise or a fall of the second encoded signal and a fourth point of time preset in a period from later than the fourth interval length from the rise or the fall of the second encoded signal to less than a twofold of the fourth interval length from the rise or the fall of the second encoded signal.

The serial communication system of the ninth embodiment of the present disclosure is that, in the serial communication system of the eighth embodiment of the present disclosure, when the first interval length is shorter than the fourth interval length, the first communication device increases the first interval length, and when the third interval length is shorter than the second interval length, the second communication device increases the third interval length.

In the serial communication system of the eighth embodiment of the present disclosure, the serial communication system of the tenth embodiment of the present disclosure further includes a controller independent of the first communication device and the second communication device, wherein when the first interval length is shorter than the fourth interval length, the controller increases the first interval length.

That is, the serial communication systems relating to the embodiments of the present disclosure correctly transmit data even when the precision of the clock frequency numbers of a transmitter and the clock frequency number of a receiver are inaccurate and the environment changes.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

According to the present disclosure, an operation control based on operation noises of an apparatus is provided to reduce the level of discomfort caused by the operation noise and improve utility of the device while securing safety of the entire of the apparatus.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A serial communication system, comprising:
  a first communication device; and
  a second communication device connected to the first communication device through a serial transmission line,
  wherein the first communication device operates in response to a first clock signal having a first clock frequency,
  wherein the second communication device operates in response to a second clock signal having a second clock frequency,
  wherein the first clock frequency or second clock frequency can change over time,
  wherein the first communication device generates a first training signal that encodes information of the first clock frequency by generating a first predetermined number of single cycles, each single cycle having a first high level interval and a first low level interval, each interval having a first interval length being equal to a first preset number of clock cycles of the first clock signal of the first clock frequency, transmits the generated first training signal to the second communication device at a first time and a second time, encodes a first data signal to generate a first encoded signal including the first high level interval and the first low level interval in the single cycle, each having the first interval length, and transmits the first encoded signal to the second communication device,
  wherein the second communication device generates a second training signal that encodes information of the second clock frequency by generating a second predetermined number of single cycles, each single cycle having a second high level interval and a second low level interval, each interval having a third interval length being equal to a second preset number of clock cycles of the second clock signal of the second clock frequency, and transmits the generated second training signal to the first communication device during the first time and the second time,
  wherein the first encoded signal represents a single bit of the first data signal by transition between the first high level interval and the first low level interval in the single cycle, and
  wherein the second communication device receives the first training signal from the first communication device, and measures a second interval length representing a clock number of the first high level interval and the first low level interval in the single cycle of the first training signal, the measured second interval length of the first training signal being measured in terms of a length of one clock cycle of the second clock signal having the second clock frequency,
  wherein the second communication device transmits the second training signal after receiving the first training signal at the first time and second time, respectively, and
  wherein the second communication device further receives the first encoded signal from the first communication device, and decodes the first data signal from the first encoded signal using the second clock.

2. The serial communication system according to claim 1, wherein the first communication device adds a parity bit to the first data signal to generate the first encoded signal including the parity bit, and the second communication device shifts a first point of time and a second point of time forward or backward over a second preset clock number based on the second clock frequency when a parity' check of the first encoded signal including the parity bit is an error.

3. The serial communication system according to claim 1, wherein the first encoded signal further includes a common mode level interval having a level between the first high level interval and the first low level interval in the single cycle.

4. The serial communication system according to claim 1, wherein the first communication device generates the first encoded signal including a training interval including the first high level interval and the first low level interval in a single cycle, each having the first interval length, the second communication device measures the second interval length representing a clock number of the first high level interval and the first low level interval contained in the single cycle of the training interval based on the second clock signal.

5. The serial communication system according to claim 1, wherein the serial transmission line is a differential transmission line.

6. The serial communication system according to claim 1, wherein the serial transmission line is AC coupled with at least one of the first communication device or the second communication device.

7. The serial communication system according to claim 1, wherein the first communication device adds an error correction code to the first data signal to generate the first encoded signal including the error correction code, and the second communication device corrects an error of the first encoded signal including the error correction code based on the error correction code.

8. The serial communication system according to claim 1, wherein the second communication device encodes a second data signal to generate a second encoded signal including the second high level interval and the second low level interval in the single cycle, each having the third interval length, and transmits the second encoded signal to the first communication device,
wherein the second encoded signal represents a single bit of the second data signal by transition between the second high level interval and the second low level interval in the single cycle,
wherein the first communication device receives the second training signal from the second communication device, measures a fourth interval length representing a clock number of the second high level interval and the second low level interval in the single cycle of the second training signal based on the first clock signal, receives the second encoded signal from the second communication device, and decodes the second data signal from the second encoded signal by detecting a level of the second encoded signal at a third point of time preset in a period from less than the fourth interval length from a rise or a fall of the second encoded signal and a fourth point of time preset in a period from later than the fourth interval length from the rise or the fall of the second encoded signal to less than a twofold of the fourth interval length from the rise or the fall of the second encoded signal.

9. The serial communication system according to claim 8, wherein when the first interval length is shorter than the fourth interval length, the first communication device increases the first interval length, and when the third interval length is shorter than the second interval length, the second communication device increases the third interval length.

10. The serial communication system according to claim 8, further comprising a controller independent of the first communication device and the second communication device,
wherein when the first interval length is shorter than the fourth interval length, the controller increases the first interval length.

11. The serial communication system of claim 1, wherein the second communication device further decodes the first data signal from the first encoded signal by detecting a level of the first encoded signal at a first point of time preset in a period from a rise or a fall of the first encoded signal to less than the second interval length from the rise or the fall and a second point of time preset in a period from later than the second interval length from the rise or the fall of the first encoded signal to less than a twofold of the second interval length from the rise or the fall.

12. The serial communication system of claim 1, wherein the first communication device receives the second training signal from the second communication device, and measures a third interval length representing a clock number of the second high level interval and the second low level interval in each single cycle of the second training signal, the measured third interval length of the second training signal being measured in terms of a length of one clock cycle of the first clock signal having the first clock frequency.

* * * * *